US012024412B2

(12) United States Patent
White et al.

(10) Patent No.: US 12,024,412 B2
(45) **Date of Patent: *Jul. 2, 2024**

(54) PIVOTING LOAD-BEARING ASSEMBLY WITH FORCE SENSOR

(71) Applicant: Cascade Corporation, Fairview, OR (US)

(72) Inventors: Brian Sinclair White, Heidelberg (AU); Davide Roncari, Portland, OR (US); Christopher M. Walthers, Gresham, OR (US)

(73) Assignee: Cascade Corporation, Fairview, OR (US)

( * ) Notice: Subject to any disclaimer, the term of this patent is extended or adjusted under 35 U.S.C. 154(b) by 556 days.

This patent is subject to a terminal disclaimer.

(21) Appl. No.: 17/137,025

(22) Filed: Dec. 29, 2020

(65) Prior Publication Data

US 2021/0114855 A1 Apr. 22, 2021

Related U.S. Application Data

(60) Continuation-in-part of application No. 16/025,778, filed on Jul. 2, 2018, now Pat. No. 10,875,755, which (Continued)

(51) Int. Cl.
*B66F 9/18* (2006.01)

(52) U.S. Cl.
CPC .................................... *B66F 9/183* (2013.01)

(58) Field of Classification Search
CPC ............................................ B66F 9/18–9/188
See application file for complete search history.

(56) References Cited

U.S. PATENT DOCUMENTS

| | | | |
|---|---|---|---|
| 2,674,387 | A | 4/1954 | Ehmann |
| 2,675,935 | A | 4/1954 | Thurow |

(Continued)

FOREIGN PATENT DOCUMENTS

| | | | |
|---|---|---|---|
| CN | 103443018 | A | 12/2013 |
| DE | 1031219 | | 5/1958 |

(Continued)

OTHER PUBLICATIONS

United States Patent and Trademark Office; International Search Report and Written Opinion for International Application No. PCT/US2021/064917 dated Mar. 17, 2022; 7 pages.

(Continued)

*Primary Examiner* — Saul Rodriguez
*Assistant Examiner* — Willie W Berry, Jr.
(74) *Attorney, Agent, or Firm* — Chernoff, Vilhauer, McClung & Stenzel, LLP

(57) ABSTRACT

A load-bearing assembly including a clamping-force sensor in a pivoting support assembly that is adjustable to vary a radial spacing between a pivot pin and a clamp pad mounted on the support assembly. A plurality of clamping-force sensors may be included in a plurality of pivoting clamp pad support assemblies to support a clamp pad and may be arranged to sense the magnitude of a clamping force exerted by a particular adjustable pivoting clamp pad support assembly and send signals indicative of the magnitude of the force to a controller. A load sensor may be located between a pivot pin and a bearing block, or strain gauges may be mounted in the pivoting bearing block so as to measure forces carried through the bearing block. Force values sensed and transmitted to the controller may be used to evaluate and adjust the clamp arm assembly to grasp a load with a desired clamping force or distribution of clamping forces.

4 Claims, 17 Drawing Sheets

Related U.S. Application Data is a division of application No. 14/923,126, filed on Oct. 26, 2015, now Pat. No. 10,011,468, which is a continuation-in-part of application No. 14/528,948, filed on Oct. 30, 2014, now Pat. No. 10,131,525.

(56) References Cited

U.S. PATENT DOCUMENTS

| | | | |
|---|---|---|---|
| 2,681,162 | A | 6/1954 | Ehmann |
| 2,844,403 | A | 7/1958 | Farmer et al. |
| 3,145,866 | A | 8/1964 | Farmer et al. |
| 3,182,837 | A | 5/1965 | Farmer et al. |
| 3,433,376 | A | 3/1969 | Jordan |
| 3,643,827 | A | 2/1972 | Link |
| 3,971,585 | A | 7/1976 | LaBuddle |
| 4,421,186 | A | 12/1983 | Bradley |
| 4,605,255 | A | 8/1986 | Olson |
| 4,695,963 | A | 9/1987 | Sagisawa et al. |
| 5,020,357 | A * | 6/1991 | Kovacevic .............. G01L 25/00 248/419 |
| 5,033,933 | A | 7/1991 | Sinclair et al. |
| 5,490,427 | A | 2/1996 | Yee et al. |
| 6,027,302 | A | 2/2000 | Nilsson |
| 7,018,159 | B2 | 3/2006 | Jordan |
| 8,517,440 | B1 | 8/2013 | Dosso et al. |
| 8,714,610 | B2 | 5/2014 | Dal Dosso et al. |
| 8,807,908 | B2 | 8/2014 | Lessard |
| 10,011,468 | B2 | 7/2018 | White et al. |
| 10,131,525 | B2 | 11/2018 | White et al. |
| 10,369,045 | B2 | 8/2019 | Gonenc |
| 10,875,755 | B2 | 12/2020 | White et al. |
| 2006/0073001 | A1 | 4/2006 | Chase |
| 2006/0104781 | A1 | 5/2006 | Merin et al. |
| 2012/0253516 | A1 | 10/2012 | Iida |
| 2013/0058746 | A1 | 3/2013 | Chase |
| 2016/0122166 | A1 | 5/2016 | White et al. |
| 2016/0122167 | A1 | 5/2016 | White et al. |
| 2018/0312384 | A1 | 11/2018 | White et al. |

FOREIGN PATENT DOCUMENTS

| | | | |
|---|---|---|---|
| EP | 1371601 | A2 | 12/2003 |
| EP | 1997771 | A2 | 12/2008 |
| EP | 2636620 | A1 | 9/2013 |
| GB | 812990 | | 5/1959 |
| GB | 829369 | | 3/1960 |
| GB | 834402 | | 5/1960 |
| GB | 908845 | | 10/1962 |
| GB | 2312417 | A | 10/1997 |
| JP | 7315789 | A | 12/1995 |
| JP | 2011-519801 | A | 7/2011 |
| JP | 2014-510002 | A | 4/2014 |

OTHER PUBLICATIONS

United States Patent and Trademark Office; International Search Report and Written Opinion dated Jan. 14, 2016 for PCT App. No. PCT/US2015/057386, filed Oct. 26, 2015, 6 pages.

Chinese Patent Office; First Office Action (including English translation) dated May 24, 2018 for Chinese Patent Application No. 201580042609.8 filed Feb. 8, 2017; 9 pages.

European Patent Office, Supplementary European Search Report, dated Aug. 26, 2013 for European Patent Application No. 13705374.0 filed Jan. 15, 2013; 3 pages.

United States Patent and Trademark Office; International Search Report and Written Opinion dated Mar. 19, 2013 for PCT App. No. PCT/US2013/021557, filed Jan. 15, 2013, 8 pages.

European Patent Office, Extended European Search Report, dated Jun. 2, 2017, for European Patent Application No. 15854492.4 filed Oct. 26, 2015; 5 pages.

International Bureau of WIPO; International Preliminary Report on Patentability dated May 11, 2017 for PCT Application No. PCT/US2013/021557 filed Jan. 15, 2013; 5 pages.

International Bureau of WIPO; International Preliminary Report on Patentability dated May 11, 2017 for PCT Application No. PCT/US2015/057386 filed Oct. 26, 2015; 5 pages.

International Bureau of WIPO; International Preliminary Report on Patentability for International Application No. PCT/US2021/064917 dated Jul. 13, 2023; 6 pages.

* cited by examiner

FIG. 8
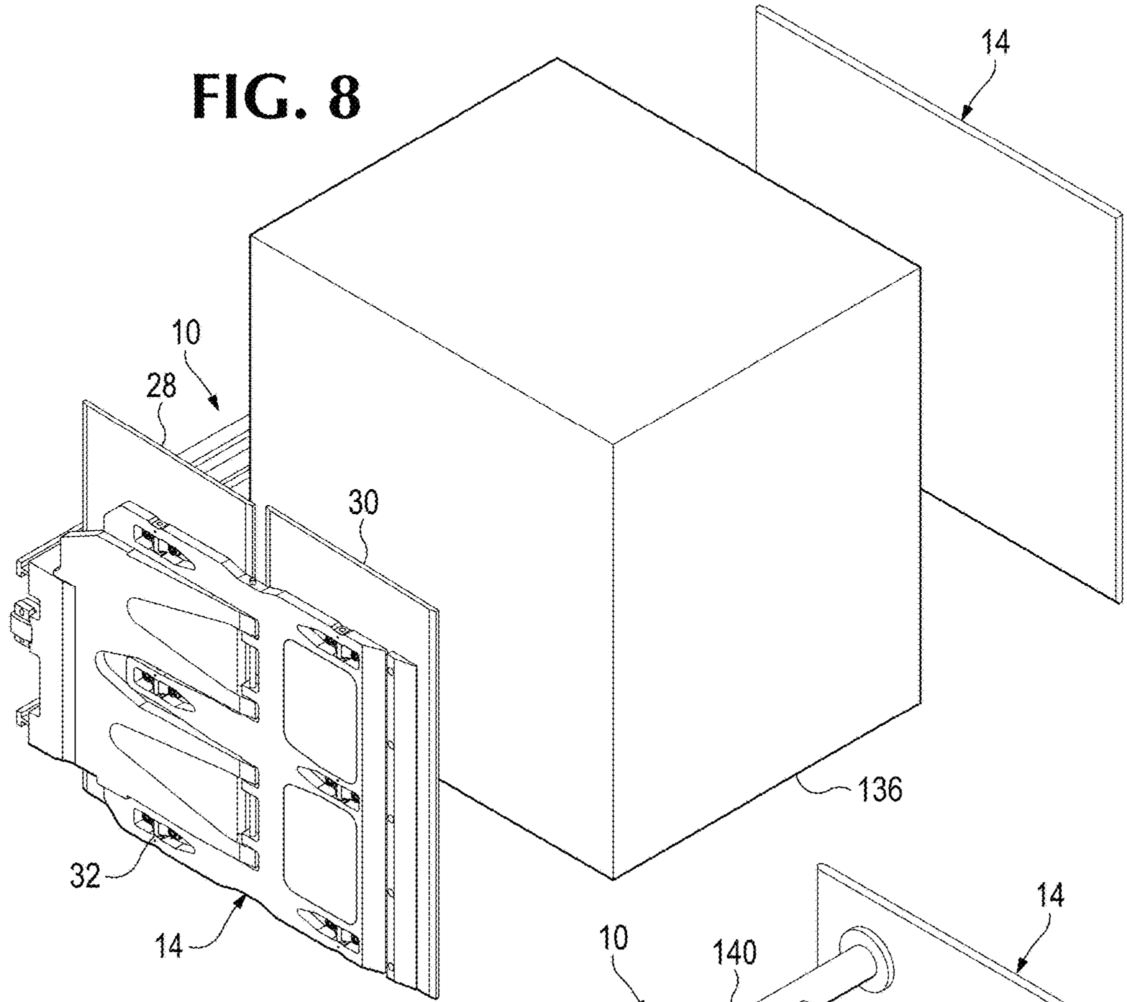
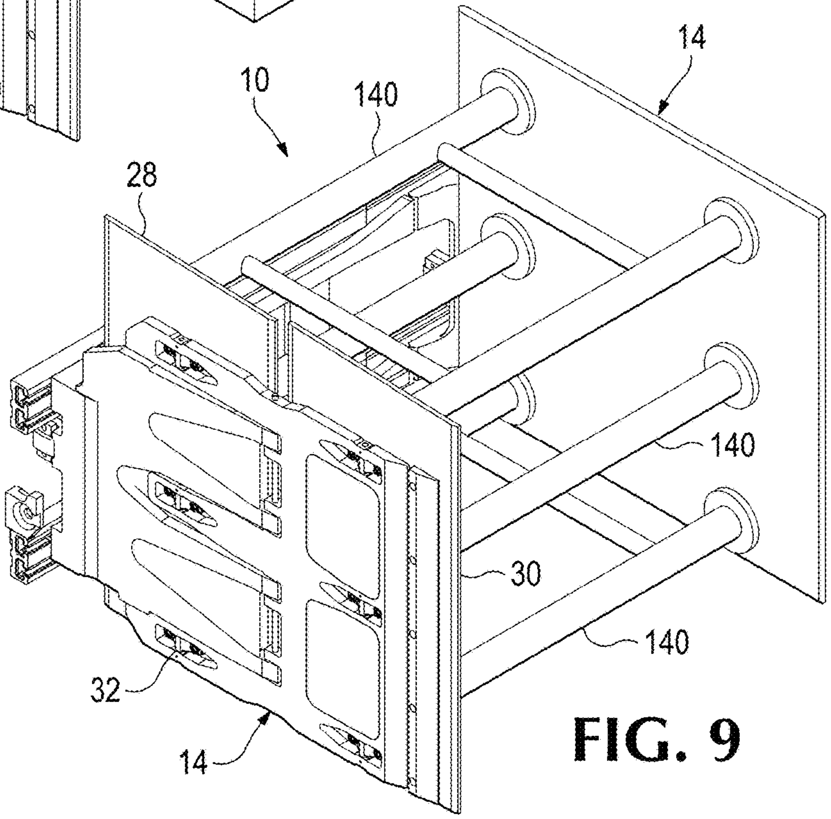
FIG. 9

PIVOTING LOAD-BEARING ASSEMBLY WITH FORCE SENSOR

CROSS-REFERENCE TO RELATED APPLICATION

This application is a continuation-in-part of U.S. patent application Ser. No. 16/025,778 filed Jul. 2, 2018, which is a divisional of U.S. patent application Ser. No. 14/923,126 filed Oct. 26, 2015, now U.S. Pat. No. 10,011,468 issued Jul. 3, 2018, which is a continuation-in-part of U.S. patent application Ser. No. 14/528,948 filed Oct. 30, 2014, now U.S. Pat. No. 10,131,525 issued Nov. 20, 2018.

BACKGROUND OF THE INVENTION

The present invention relates to a pivoting load-bearing assembly including a force sensor arranged to measure a force in a particular direction, for example, to measure a clamping force in a load clamp for a lift truck, such as a carton clamp for use in handling large household appliances packed in corrugated cardboard cartons, or a paper roll clamp for handling large paper rolls in warehouses.

Lift trucks used for handling goods in warehouses may be equipped with specialized load clamping attachments intended to grip various types of loads securely. A lift truck may have a specialized paper roll clamp or a carton clamp including a pair of upright generally planar clamp arm assemblies extending forward from the lift truck and supporting generally parallel, opposed clamp pads. The clamp arms of load clamps are movable toward or away from each other laterally of the lift truck in order to grip or release a load.

As for carton clamps, while most cartons or similar containers have parallel upright sides, because of the nature of the goods inside the carton and other packing material within the outer skin of a carton, while it is generally desired to provide an even clamp force distribution, that may be difficult to achieve because of various mechanical factors. In some situations, it may be desirable to provide pressure against the exterior of a carton of a certain type in an uneven distribution, such as by providing greater pressure near the bottom of a carton and lesser pressure near the top of the part of the carton engaged by the clamp arm assembly. Similarly, it may be desirable to provide a certain distribution of clamping pressure on the other types of loads such as paper rolls. For some loads, such as large tires, it may be important to know the total force exerted by a load clamp. In these and other situations, it would be useful to know how much pressure is actually applied to a load as it is being grasped. While it has been known to calibrate lift trucks and control force by controlling hydraulic pressure, it is desired to have an actual clamping force measurement available during operation.

It is desirable for the clamp pad or clamp pads of a carton clamp to be free to at least a small extent, in order to accommodate clamp arm deflection and conform better to the shape of a carton and, to some extent, the contents of the carton. This capability is addressed in prior art Ehmann, U.S. Pat. Nos. 2,681,162 and 2,674,387, Link, U.S. Pat. No. 3,643,827, Farmer, U.S. Pat. No. 3,145,866, and Farmer, et al., U.S. Pat. Nos. 2,844,403 and 3,145,866, for example, which disclose clamp pads mounted on carton clamp arms in ways which allow a small amount of articulation.

Dosso et al (U.S. Pat. No. 8,517,440) discloses a lift truck clamping attachment for handling cartons in which clamping pads are mounted so as to be adjusted so that the pressure provided by the clamp pads provides a desired distribution of the clamping pressure on the packages to be hoisted and transported.

It is known that strain gauges can be incorporated in large shackle pins or pivot pins or axles supporting, for example, sheaves for load-carrying cables of cranes, to provide electrical signals representative of a load to which such a shackle pin or axle is subjected, but use of such a strain gauge arrangement in a smaller pivot pin or axle may not be practical, and is quite costly, may require greater manufacturing precision than is desirable in the fit of such a pin to a set of bores in which the pin is to located, and may compromise the strength of the pivot pin in situations where relatively small forces are to be used yet are desired to be measured accurately. Additionally, such load pins are not well adapted to use in situations where bending forces in other than the direction of interest may be applied to such pins.

It is therefore desired to have a pivoting load-carrying assembly including an arrangement in which a force exerted in a particular direction by the load-carrying assembly can be measured in an isolated manner.

SUMMARY OF THE INVENTION

As disclosed herein, a sensing device is provided in connection with at least one and advantageously more than one of a plurality of pivoting load-bearing assemblies such as clamp pad support assemblies to measure the force exerted in a particular direction by a particular clamp pad support assembly. Force values can be considered as a basis for adjustment of a clamp pad support assembly or particular ones of a set of them. In some embodiments of the pivoting load-bearing assembly, an adjustment of a radial distance between a pivot axis and the attachment of a clamp pad or the like may be provided.

As one aspect of the present invention, a mounting assembly for a load-clamping member is provided in which there is a pivoting support assembly including a bearing block and a pivot pin extending through the bearing block; a support member arranged to provide support for the pivoting support assembly in an axial direction and to transmit a clamping force in a radial clamping-force direction with respect to the pivot pin; a clamping-force isolating arrangement in the pivoting support assembly arranged to isolate and transmit clamping force from the support member to the pivoting support assembly in said clamping-force direction separately from providing support in the axial direction; and a force sensor in the pivoting support assembly located so as to measure the clamping force and arranged to provide a signal representative of the clamping force.

As another aspect, there is provided a pivoting load-bearing assembly including a force-measuring sensor, comprising a pivoting support assembly including a bearing block and a pivot pin extending through the bearing block; a support member arranged to provide support for the pivoting support assembly and to transmit force in a radial direction with respect to the pivot pin to the pivoting support assembly, the pivoting support assembly being located in a receptacle defined in the support member and being fastened to the support member by the pivot pin; a force-isolating arrangement, arranged to isolate and transmit the force in a radial direction from the support member to the pivoting support assembly separately from providing support to the pivoting support assembly; and a force sensor located in the pivoting support assembly, between the bearing block and the pivot pin, so as to measure said force in a radial direction and to provide a signal representative of the amplitude of that force.

Also provided is a load grasping assembly for a lift truck, comprising a clamp arm adapted to be mounted on a lift truck; a clamp pad; a pivoting clamp pad support assembly carried by the clamp arm and connected to and supporting the clamp pad, the clamp pad support assembly being mounted so as to pivot through a limited angle with respect to the clamp arm and including a force sensor mounted in such a way as to sense in isolation a force exerted by the pivoting clamp pad support assembly in a predetermined direction while the load grasping assembly grasps a load, and to provide a an electrical signal representative of a magnitude of the force exerted in the predetermined direction.

As yet a further aspect, a method is provided for adjusting a load grasping assembly for a lift truck equipped with a load grasping assembly including a clamp arm, a clamp pad mounted to the clamp arm through a pivoting clamp pad support assembly, and a force sensor included in the clamp pad support assembly, the method comprising providing a test load body having a predetermined configuration, grasping the test load body with the load grasping assembly, obtaining a signal from the force sensor representative of the force exerted in a predetermined direction by the pivoting clamp pad support assembly, determining from the signal a magnitude of a grasping force exerted in the predetermined direction by the pivoting clamp pad support assembly while grasping the test load body, and in response, adjusting a clamping force applied by the clamp arm.

A method is also provided of utilizing signals from each of a plurality of force sensors in respective ones of a group of pivoting clamp pad support assemblies supporting a clamp pad to determine whether the distribution of forces exerted through the pivoting clamp pad support assemblies is appropriate, and, in response adjusting a distance adjustment included in at least one of the pivoting clamp pad support assemblies and thereby adjusting the distribution of forces exerted through the plurality of clamp pad support assemblies to support the clamp pad.

The foregoing and other features of the invention will be more readily understood upon consideration of the following detailed description of the invention, taken in conjunction with the accompanying drawings.

BRIEF DESCRIPTION OF THE DRAWINGS

FIG. 8 is an isometric view of a clamp assembly and a test body useful for checking the adjustment of the pivoting clamp pad support assemblies.

FIG. 9 is an isometric view of a carton clamp assembly together with a set of cams equipped with force sensors, used to calibrate the force sensors in the adjustable pivoting clamp pad support assemblies.

DETAILED DESCRIPTION OF EMBODIMENTS

Figure 1:
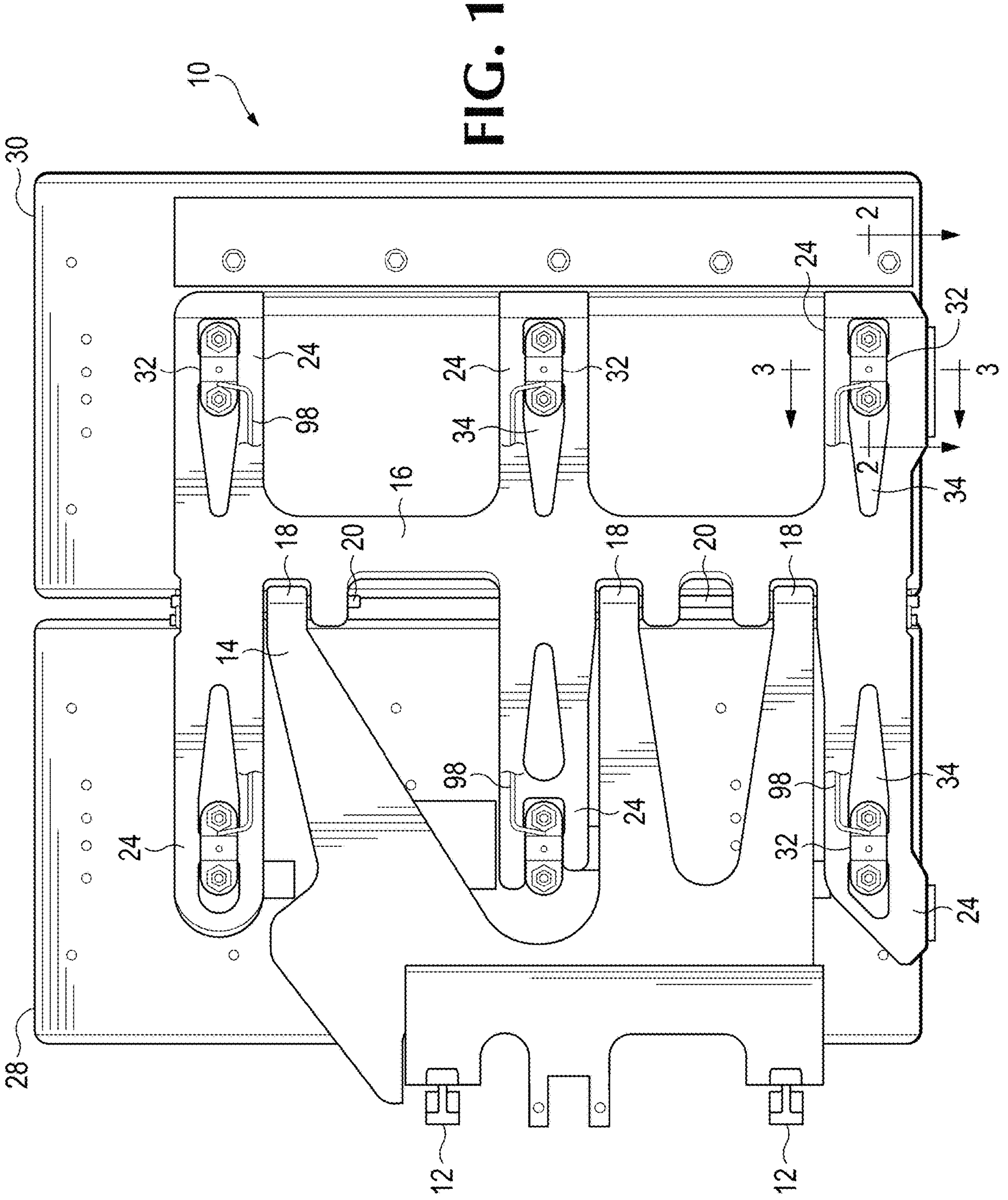
FIG. 1 is a side elevational view of a clamp arm assembly for a lift truck, including clamp pads mounted on the clamp arm assembly with the use of adjustable pivoting clamp pad support assemblies.

Referring first to FIG. 1 of the drawings, in a load clamp assembly that includes one embodiment of the subject matter disclosed herein a carton clamp arm assembly 10 for a lift truck includes transversely oriented horizontal members 12 adapted to be attached to a front of a lift truck (not shown), to permit the clamp arm assembly 10 to move transversely with respect to the lift truck, so that an opposed pair of such clamp arm assemblies 10 can move toward or away from each other to grip or release a load. Carried on the transverse members 12 is a clamp arm 14 that extends forward from the lift truck on which the clamp arm assembly 10 is mounted for use. A load stabilizer 16 is mounted on the outer ends 18 of the clamp arm 14, attached to the outer ends 18 by coaxial pins 20 defining a substantially vertical pivot axis of a hinge-like connection. The stabilizer 16 thus can pivot about the coaxial pins 20, to allow for deflection of the clamp arm 14 or misalignment of a package to be gripped. The stabilizer 16 may be a substantial steel member with a generally vertical central trunk portion and respective sets of multiple horizontal finger-like members 24 extending forwardly and rearwardly from the trunk. While three finger-like members 24 are shown in each direction here, there may be two to five finger-like members in various applications.

A load-contact pad, such as a carton clamp pad, may be a unitary member (not shown) or may, as shown, have the form of two large generally rectangular and substantially flat load-contact pad members 28 and 30 of a split load-contact pad. The load-contact pad members 28 and 30 are carried respectively on the rearwardly-extending and forwardly-extending finger-like horizontal members 24 of the load stabilizer 16. Each of the load-contact or carton clamp pad members 28 and 30 is attached to the load stabilizer 16 by three adjustable pivoting clamp pad support assemblies 32, also called adjustable pivot assemblies, each of which is mounted within a receptacle 34 defined by a respective one of the finger-like horizontal members 24. Each of the receptacles 34 may be an opening extending through the respective finger-like portion 24 of the stabilizer 16.

Figure 2:
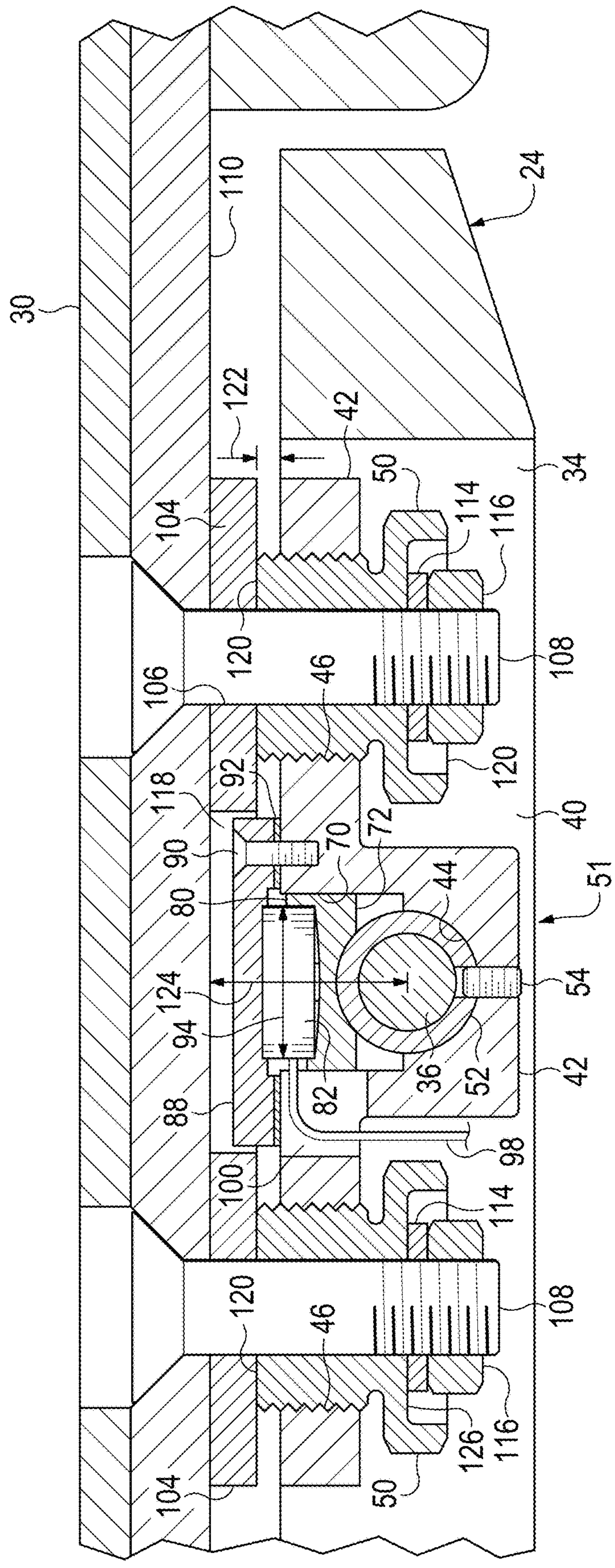
FIG. 2 is a sectional view of one of the adjustable pivot assemblies included in the clamp arm assembly, taken along line 2-2 in FIG. 1, at an enlarged scale.
Figure 3:
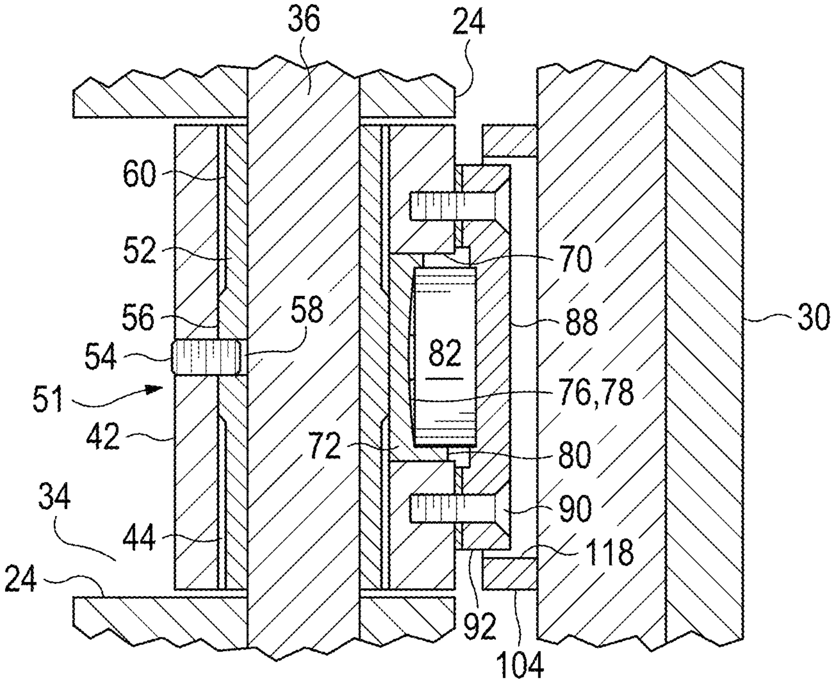
FIG. 3 is a sectional view of the adjustable pivot assembly shown in FIG. 2, taken along line 3-3 in FIG. 1, at an enlarged scale.
Figure 4:
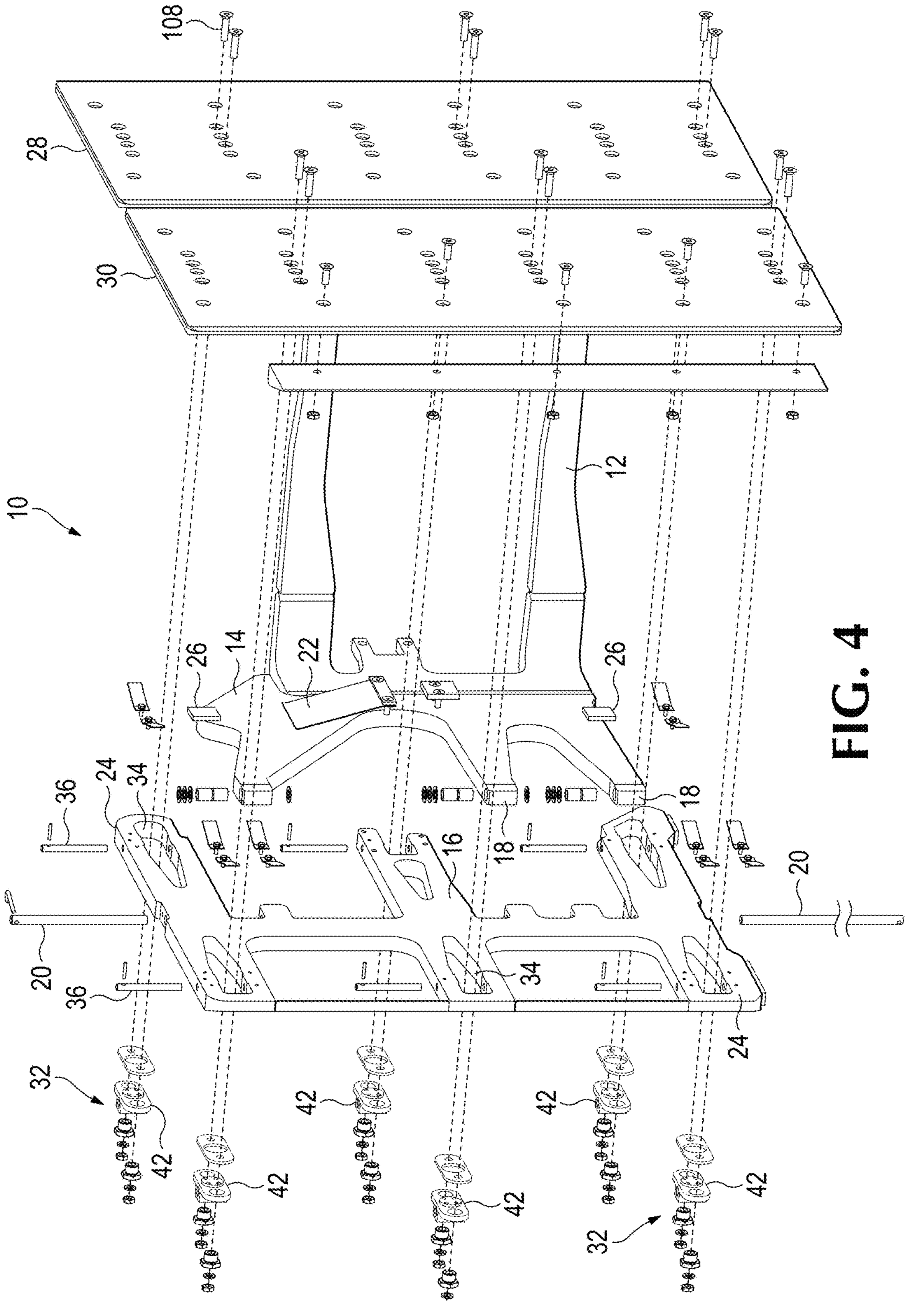
FIG. 4 is an exploded isometric view of the clamp arm and clamp pad assembly shown in FIG. 1, taken from the upper left front.

Referring also to FIGS. 2, 3, and 4, a spring 22 is mounted on one of the finger-like portions 24 of the load stabilizer 16 and presses against an inner face of the clamp arm 14, tending to rotate the load stabilizer 16 about the coaxial pins 20, while a pair of stop members 26 mounted on the clamp arm 14 limit angular movement of the load stabilizer 16 to a slightly toed-out attitude.

For each of the separate carton clamp pad members 28 and 30 a pivot axis is defined by respective pivot pins 36 extending vertically through coaxially aligned bores 38 in the respective finger-like members 24 supporting the clamp pad 28 or 30 and securing the respective adjustable pivoting clamp pad support assemblies 32 in the receptacles 34.

Figure 5:
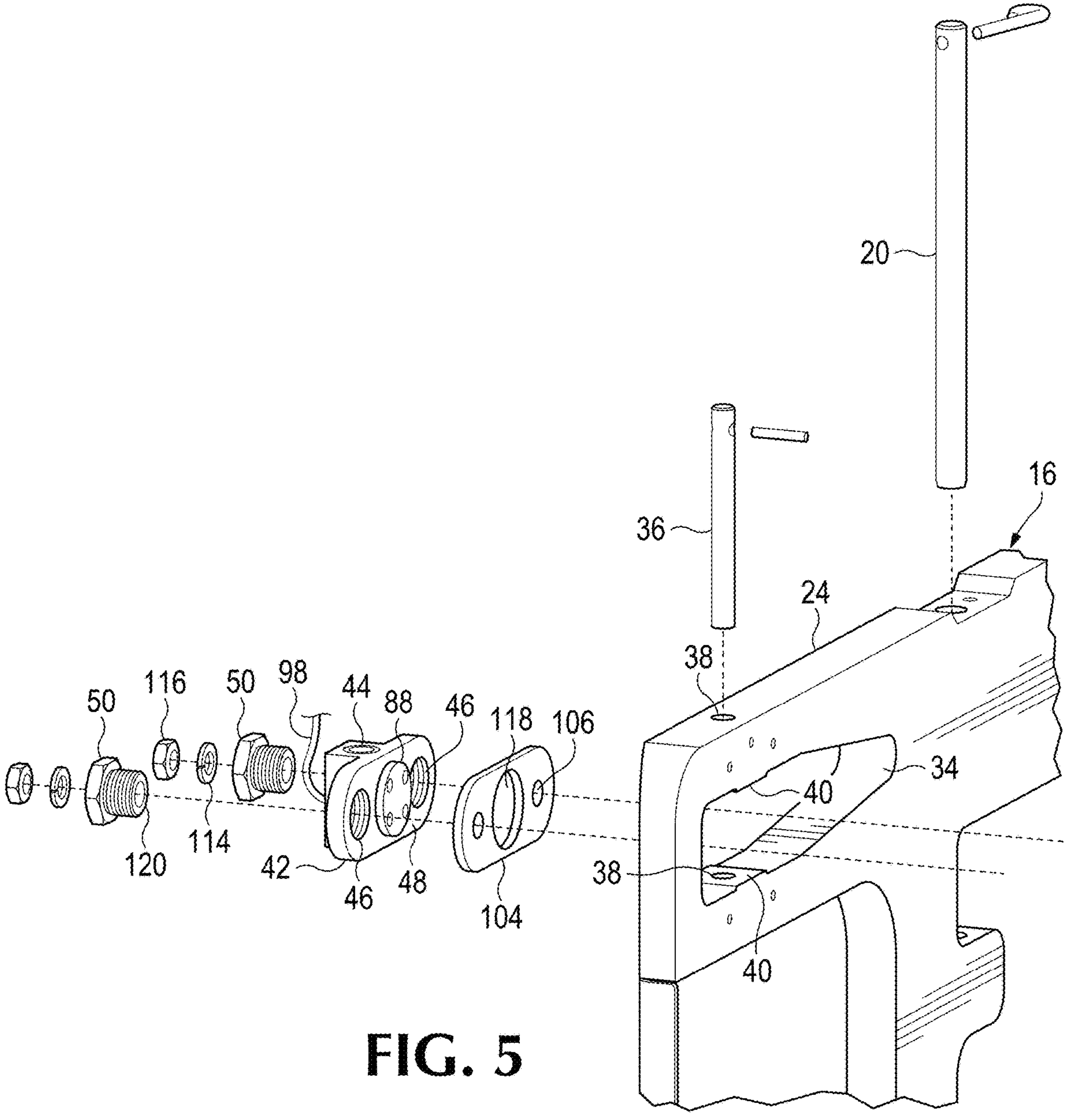
FIG. 5 is an exploded isometric view of a portion of FIG. 4 including one of the adjustable pivoting clamp pad support assemblies, at an enlarged scale.

As shown best in FIG. 5, each receptacle 34 may include a pair of opposed upper and lower horizontal bearing faces 40 between which a respective adjustable pivoting clamp pad support assembly 32 is located, and the bores 38 for the pivot pins 36 extend through the bearing faces 40.

Figure 6:
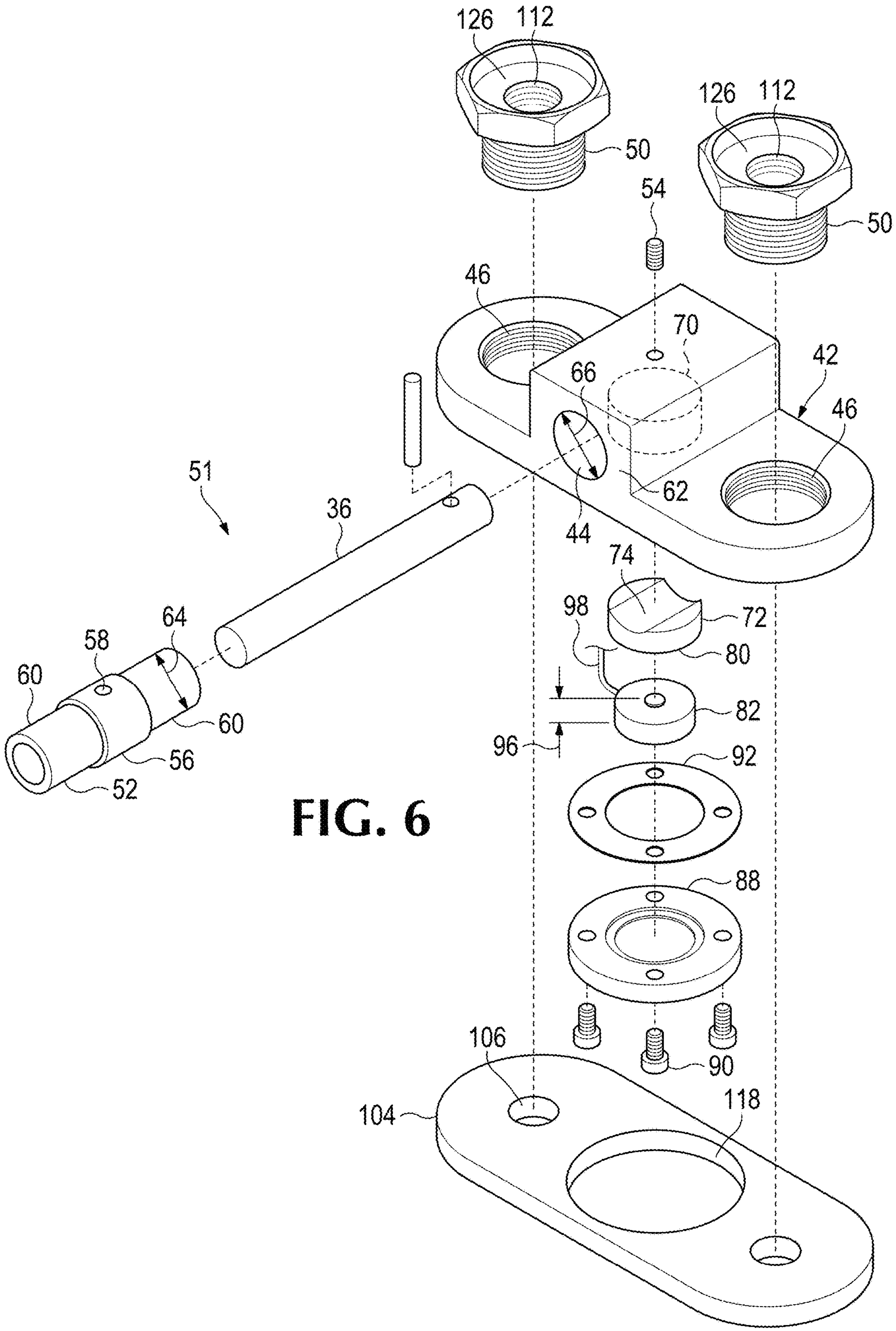
FIG. 6 is an exploded isometric view of a bearing block and associated parts of an adjustable pivoting clamp pad support assembly such as the ones shown in FIGS. 1, 3, and 5.

Referring also to FIG. 6, each adjustable pivoting clamp pad support assembly 32 includes a bearing block 42 defining a pivot pin bore 44 to receive a pivot pin 36. A pair of threaded bores 46 extends through a flat base or inner face 48 of the bearing block 42 in a direction perpendicular to the axis of the pin bore 44. An adjustment collar 50, which has external threads and which may have a portion shaped to be engaged by a wrench, is threaded into each of the bores 46 as may be seen in FIG. 2 and acts as a positioning member, as is described below.

The pressing or grasping pressure forces exerted inwardly by the pivoting support assemblies 32 urging the clamp pads 28 and 30 toward each other are carried from each finger-like horizontal member 24 of the clamp arm 14 and transmitted by the bores 38 and the respective pivot pin 36. The pressing, or clamping, force is isolated by a clamping-force isolating subassembly 51 and is transmitted from each pivot pin 36 to a load tube 52 fitted in the pin bore 44 of the bearing block 42. The load tube 52 fits snugly but rotatably about the pivot pin 36. A central portion 56 of the load tube 52 fits within the pin bore 44 of the bearing block 42 and nearly in contact with an interior surface of the pin bore 44, and is located and oriented so as to receive a fastener such as the screw 54 in a small hole 58 that may be provided in the outer surface of the central portion 56 to keep the load tube 52 in its intended location and orientation in the bearing block 42. The load tube is still free, however, to move radially a small distance within the bore 44 as will be explained presently. Outer end portions 60 of the load tube 52, extending from the central portion 56 toward the upper and lower faces 62 of the bearing block 42, are slightly smaller in exterior diameter 64 than the interior diameter 66 of the pin bore 44, to provide a radial space between the end portions 60 and the interior of the pin bore 44, where the pivot pin 36 and the load tube 52 may flex under load without bearing on the interior surface of the pin bore 44. It will be understood that the load tube 52 might instead be of a constant size along its end portions 60 and central portion 56, in which case the interior diameter of the pin bore 44 surrounding the end portions 60 could be larger to provide radial clearance around the load tube 52. A cavity 70, which may be cylindrical, extends into the bearing block 42 from the outer face 48 and intersects with the pin bore 44. A central axis of the cavity 70 is oriented in the direction of forces that it is desired to measure, and the cavity 70 needs to extend deeply enough so that all the forces exerted in the direction of interest are carried through the central portion 56 of the load tube 52 to the plunger 72. At the same time, the cavity 70 needs to be shallow enough to leave the central section 56 of the load tube 52 able to receive forces in directions other than along the central axis of the cavity 70, so that those forces can be carried from the bearing block 42 to the finger 24 of the load stabilizer 16 or an equivalent member of a load clamp assembly of another type.

A plunger 72 is fitted slidably within the cavity 70 and may have a concave cylindrical inner end surface 74 that fits against and conforms to the shape of the exterior surface of the central part 56 of the load tube 52, so that inwardly-directed, load-grasping forces of the respective fingerlike member 24 are carried through the pivot pin 36 and the central part 56 of the load tube 52 and are applied to the plunger 72.

A force-transmitting outer end 76 of the plunger 72 has a contact surface 78 which may have a concave, large-radius, spherical shape and which may be surrounded by a shallow rim 80.

A button-like force-sensing or load cell 82 may have a centrally located contact portion including a contact face 84 that may have a large radius convex spherical contact surface that corresponds with the shape of the contact surface 78, and that rests against and may be centered on the contact surface 78 of the plunger 72, while the load cell 82 is held in a central location by the rim 80. An oppositely-located base surface 86 of the load cell 82 rests against an interior face of a retainer plate 88 that is fastened to the inner face 48 of the bearing block 42 by suitable fasteners such as screws 90 extending through corresponding holes in the retainer plate 88 into respective threaded bores in the inner face 48 of the bearing block 40. A shim 92 may be provided in an appropriate thickness to establish sufficient space for the load cell 82, yet assure that the retainer plate 88 has positive contact with and through the load cell 82, the plunger 72, and the central part 56 of the load tube 52 to the interior surface of the pin bore 44, so that forces directed inwardly, in a clamping direction, by the pivot pin 36 are carried in isolation to the bearing block 42 through the load tube 52, the plunger 72, the load cell 82, and the retainer plate 88, and can thus be sensed by the load cell 82. At the same time, however, the plunger 72 is intended to ensure that only the compressive load-clamping forces are transmitted to the load cell 82, while forces in other directions, such as load-lifting vertical forces, are carried to the bearing surfaces 40 through the upper and lower faces 62 of the bearing block 42. Thus, the load cell 82 will measure only forces in the direction in which the plunger 72 is free to move in the cavity 70.

The load cell 82 may be a subminiature industrial compression load cell available from various sources, such as OMEGA Engineering, Inc., of Stamford, Connecticut One acceptable load cell has a diameter 94 of about 19 mm and a thickness or height 96 of about 6.5 mm and may be obtained in an appropriate capacity, depending upon the clamping force desired to be applied. A load cell 82 having a capacity of 2230 N, for example, may be used, or a load cell which has a similar size and a capacity of, for example, 4450 N may also be used. A signal conductor 98, including a suitable wire or wires, extends from the load cell and passes through an opening 100 provided through the bearing block 42 to carry an electrical signal representative of the pressure exerted on the load cell 82 by the retainer plate 88 and the plunger 72 when the clamp arm assembly 10 is exerting inwardly directed clamping force upon a load. The signal conductor 98 for the type of load cell 82 described above, for example, includes a pair of excitation wires and a pair of signal conducting wires.

A flat spacer plate 104, which may have a shape similar to that of the outer face 48 of the bearing block 42, defines a pair of bores 106 that are coaxially aligned with the bores 46 in the bearing block 42. Fasteners such as flat head screws 108 may be countersunk in and extend through a supporting plate portion 110 of the clamp pad 28 or 30, through the bores 106 in the spacer plate 104, and be engaged in threaded bores 112 defined by the collars 50, holding the spacer plate 104 tightly against the inner ends 120 of the collars 20. A lock-washer 114 and a self locking nut 116 may be provided on the flat head screw 108 and tightened against the collar 50 to retain the screw 108 with the clamp pad 28 or 30 held tightly against the spacer plate 104 as shown in FIG. 2 and to keep the spacer plate 104 from moving with respect to the collar 50. The spacer plate 104 defines an opening 118 somewhat larger than the retainer plate 88, so that the spacer plate 104 can be close to or rest flush against the face 48 of the bearing block 42, with the retainer plate 88 in the opening 118.

As shown in FIG. 2, an inner end 120 of the adjustment collar 50 extends proud of the outer face 48 of the bearing block 42, and keeps the spacer plate 104 an adjustable distance 122 away from the inner face 48 of the bearing block 42. Thus, as shown in FIG. 2, a radial distance 124 between the axis of the pivot pin 36 and the support plate 110 of the clamp pad 30 is defined by the location of the spacer plate 104 against the inner end 120.

As shown best in FIGS. 2, 3, and 5, and also in an enlarged, exploded view in FIG. 6, with the adjustable pivoting clamp pad support assemblies 32 all assembled as is the one shown in FIG. 2, both of the clamp pad members 28 and 30 are parallel with the central axes defined by the pivot pin bores 38 and pin bores 44 and thus are positioned so as to provide equal pressure along the entire height of the respective clamp pad 28 or 30 against a vertical side of a carton to be gripped by the carton clamp. The orientation of, and to some extent the shape of, each clamp pad 28 or 30 may be changed, however, by adjusting the clamp pad support assemblies 32 to vary the spacing, that is, the radial distance 124, between the clamp pad plate portion 110 and the central axis of the respective pivot pin 36 and pin bore 44, as shown in FIG. 2. The adjustable support assemblies 32 may be adjusted by loosening the lock nuts 116 and the screws 108, relieving pressure from the adjustment collars 50. The collars 50 may then be backed out from or screwed in farther through the threaded bores 46 in the bearing block 42 toward the spacer plate 104. The inner end 120 of each collar 50 bears against the spacer plate 104 and establishes a selected position of the adjacent part of a clamp pad support plate 110 by varying the gap distance 122 between the spacer plate 104 and the inner face 48 of the bearing block 42, within a range of available positions determined by the lengths of the collars 50 and the resulting distance 122 to which each can be made to protrude beyond the inner face 48 of the bearing block 42. With the screws 108 tightened, the lock nuts 116 may be tightened against the lock washers 114 and the depressed face 126 of the respective collar 50. This keeps the spacer plate 104 positioned tightly against the inner ends 120 of the collars 50, establishing and maintaining the gap 122 between the bearing block 42 and the spacer plate 104, and thus establishes the radial distance 124.

Figure 7:
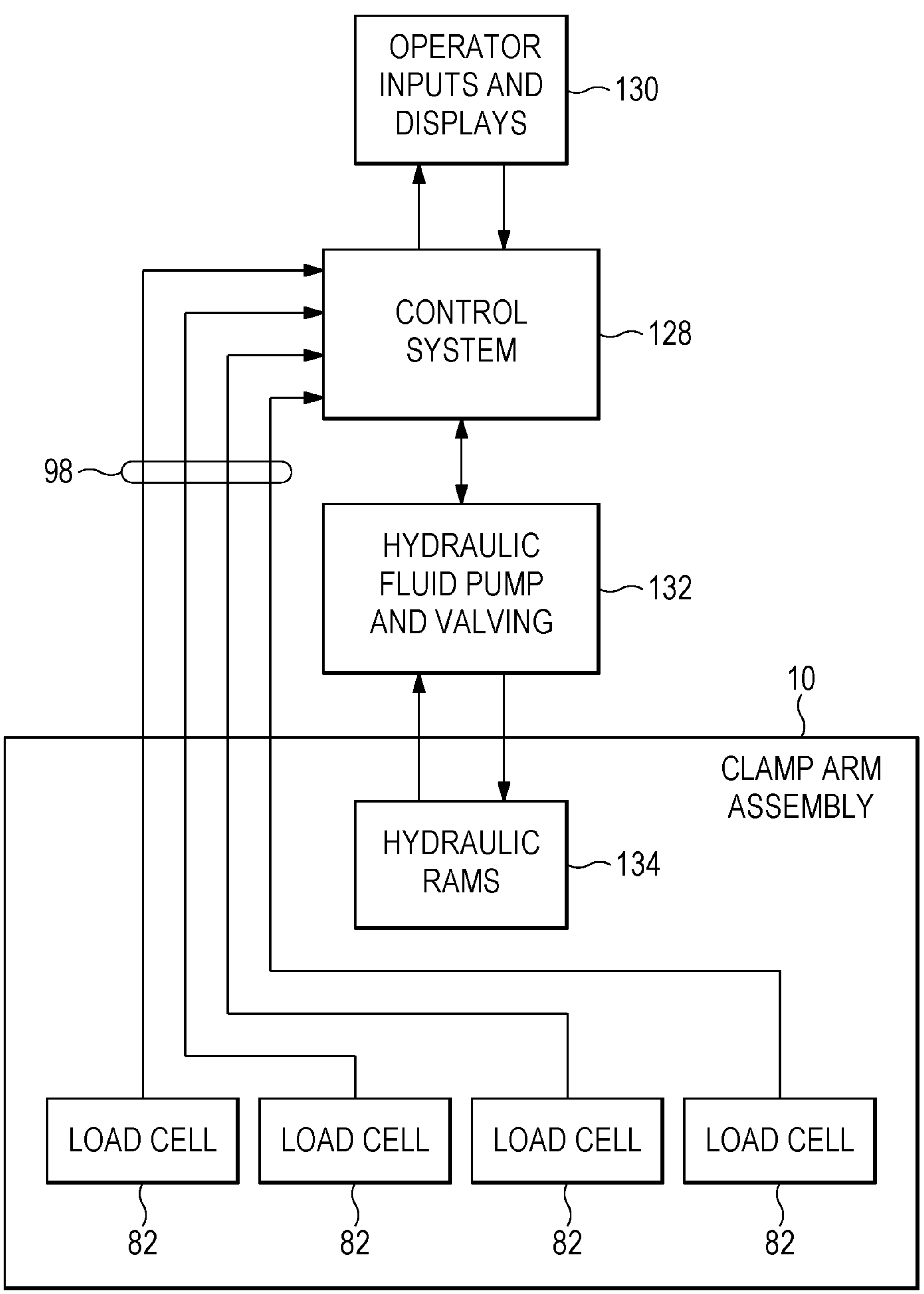
FIG. 7 is a diagrammatical view of a system incorporating the adjustable pivoting clamp pad support assemblies.

The signal conductor 98 may be connected electrically to a system controller 128 of the lift truck equipped with a clamp arm assembly 10 incorporating the load-sensing adjustable pivoting support assembly 32, as shown in FIG. 7. In response to receiving signals from one or more pivoting clamp pad support assemblies 32 representing the force transmitted in a predetermined direction by each of those one or more pivoting clamp pad support assemblies 32, the controller 128 may adjust the amount of hydraulic or other mechanical force applied to the clamp arm assembly 10 on which the load-sensing adjustable pivoting clamp pad support assemblies 32 are mounted.

In a more general sense, then, a pivoting support assembly 32, equipped with a load cell and a pivot pin 36 and a load tube 52 fitting against a plunger carried so as to be movable radially with respect to the pivot pin, in the direction in which an applied force is desired to be measured, and wherein the pivot pin has radial clearance to allow some flexure of its end portions adjacent to the central portion, permits accurate measurement of forces actually exerted in the direction of interest in pivoting force-applying mechanisms where the pivot pins are too small to incorporate a strain gauge arrangement safely or economically.

Figure 10:
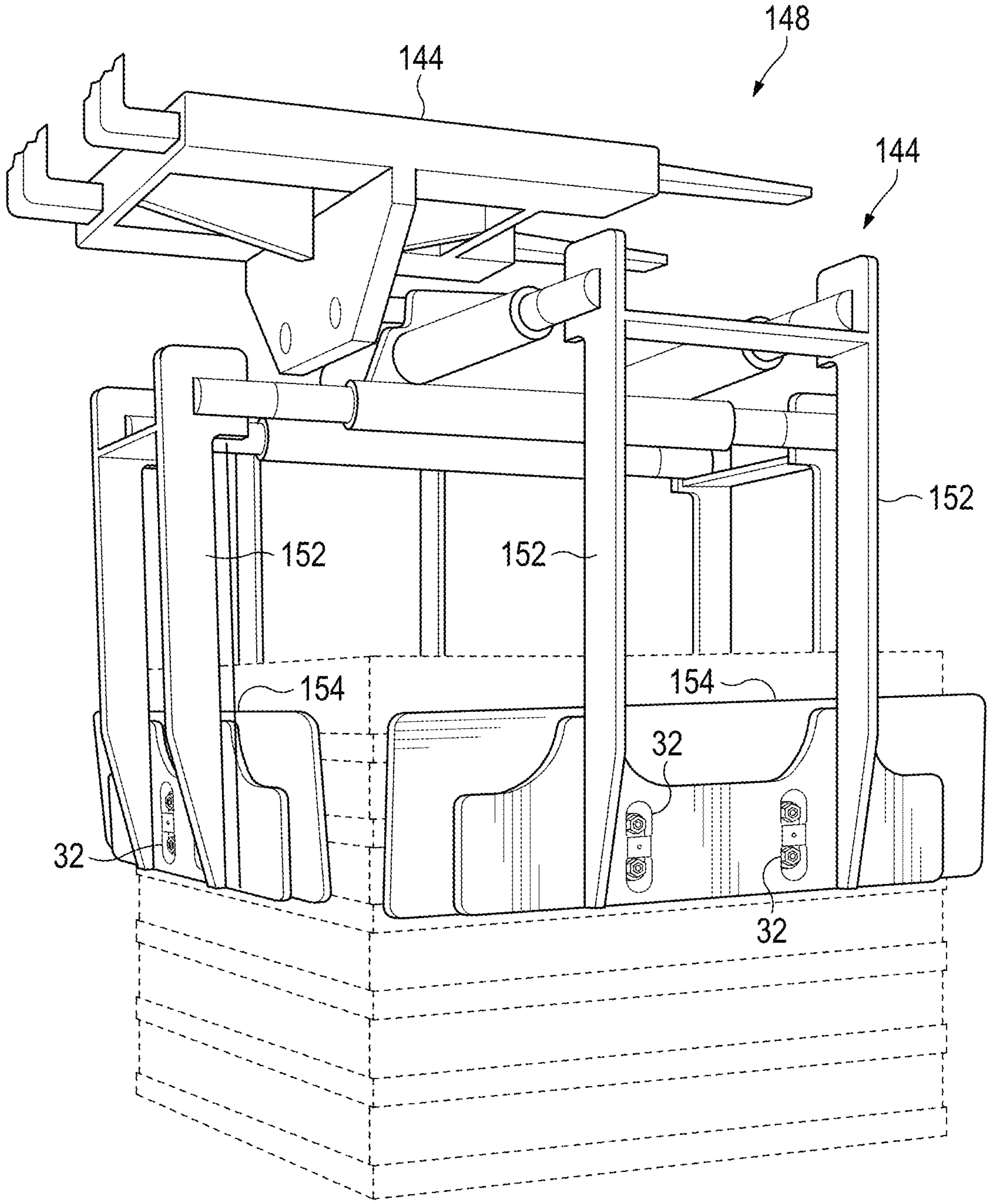
FIG. 10 is a perspective view of a layer picker clamp fork lift attachment incorporating the adjustable clamp pad support assemblies, shown grasping a selected number of layers of a stack of cartons of canned goods.

The adjustable pivoting support assembly 32 has been described above with respect to its use in a load clamp assembly 10 in the form of a carton clamp arm assembly 10, as shown in FIG. 10. The adjustable pivoting support assembly 32 may also be used in other applications where it is desired to measure in isolation the forces exerted in a particular direction, such as a radial direction relative to a pivot shaft, as in other types of load grasping clamp equipment such as, for example, a layer picker clamp assembly.

As shown schematically in FIG. 7, information such as an electrical signal from each of the load cells 82 is transmitted by the signal conductors 98 to the central controller 128 that can utilize or give an indication of the force exerted at a particular time by each pivoting clamp pad support assembly 32, and a closed loop feedback system can use the value of the clamping force as thus measured to provide the desired amount of clamping force to handle the load to be grasped. An operator input and display unit 130 may be associated with the controller 128. The controller 128 may control a hydraulic fluid pump and valving system 132 connected operatively to hydraulic rams 134 incorporated in the clamp arm assembly 10. Alternatively, other types of motors such as pneumatic cylinder and piston assemblies or electric motors and appropriate power sources may be used instead of a hydraulic system.

As illustrated in FIG. 8, a clamp arm assembly 10 may be tested or checked routinely by having a test body 136 of known dimensions and rigid construction and clamping it with a predetermined total clamping force exerted by the clamp arm assembly 10. The force sensed by the load cell 82 of each of the several pivoting clamp pad support assemblies 32 is transmitted to the central controller 128. This allows the distribution of forces exerted by the several pivoting clamp pad support assemblies 32 to be evaluated. If it is observed that clamping forces are not distributed as desired, as when one of a related pair or group of the pivoting clamp pad support assemblies 32 is exerting too great a load, the collar members 50 may be backed out through the bearing block 42 of that one of the pivoting clamp pad support assemblies 32 after loosening the associated lock nut 116, allowing the related portion of the clamp pad 28 or 30 to move back or protrude less.

Especially where a lift truck is to be used to clamp loads that are of a routinely consistent configuration, the adjustable pivoting support assemblies 32 described above provide force measurement during actual clamp assembly operation that can allow the load grasping mechanism to be adjusted to provide optimum pressures distributed as desired along the surface of the loads to be grasped and lifted.

A set of hydraulic rams 140, each equipped with a force sensor (not shown) may be used between the clamp arms 14 of the clamp assembly 10, with each ram 140 aligned with one of the pivoting clamp pad support assemblies 32, as shown in FIG. 9, to calibrate the load cells 82.

It may be important to have an actual force measurement available in other related mechanisms in order to prevent overloading a clamp arm of a forklift unit. The force measurement may be used to determine that forklift arms are not overloaded by their use to lift and move large, heavy loads.

With some modifications, the pivoting support assembly 32 can be used to measure forces applied between a load and load engagement surface of many types of forklift attachments. It can be used to balance clamping forces applied to a load, to limit forces applied to a load, to selectively distribute forces applied to a load, to warn of excessive forces, to sum several forces applied to determine the total of applied forces, or even to sum forces on different load-engaging surfaces and applied in different directions.

For example, in tire-handling lift truck attachments intended to lift and rotate large wheels and to mount such wheels on large machines such as earthmoving equipment, pivoting clamp pad support assemblies 32 including load cells 82 can be used to ensure that a tire handling clamp is not subjected to excessive forces by increasing the inflation pressure in a tire being held in such a tire handling attachment.

As another example, it may be desirable to have an accurate representation of clamping forces applied by other load handling mechanisms such as a layer picker forklift attachment 144 as shown in FIG. 10, where it is important to have sufficient force to grasp the load and it is also important not to use too much force.

Figure 11:
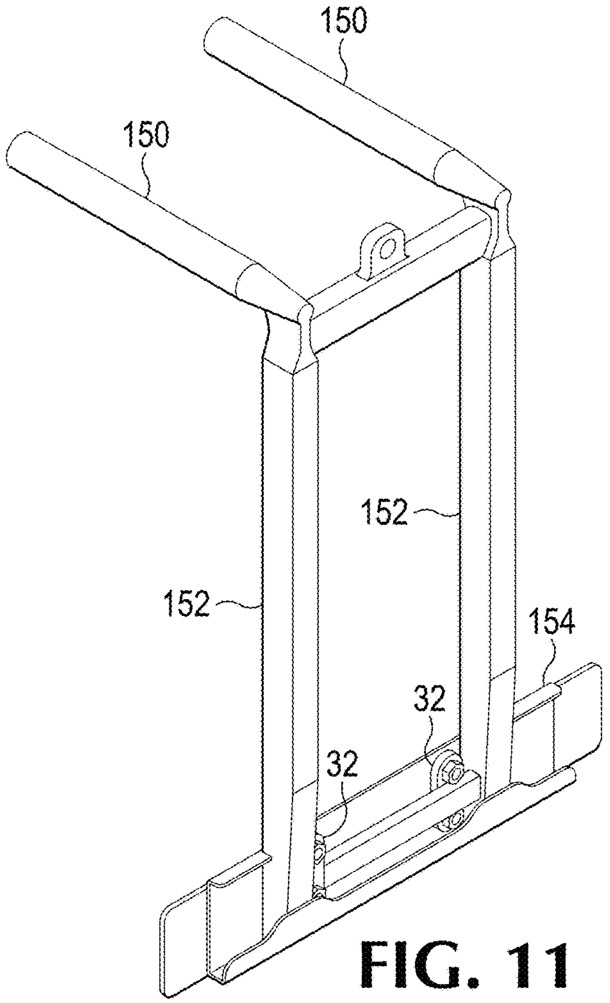
FIG. 11 is a perspective view of one clamp arm assembly for a layer picker such as that shown in FIG. 10.
Figure 12:
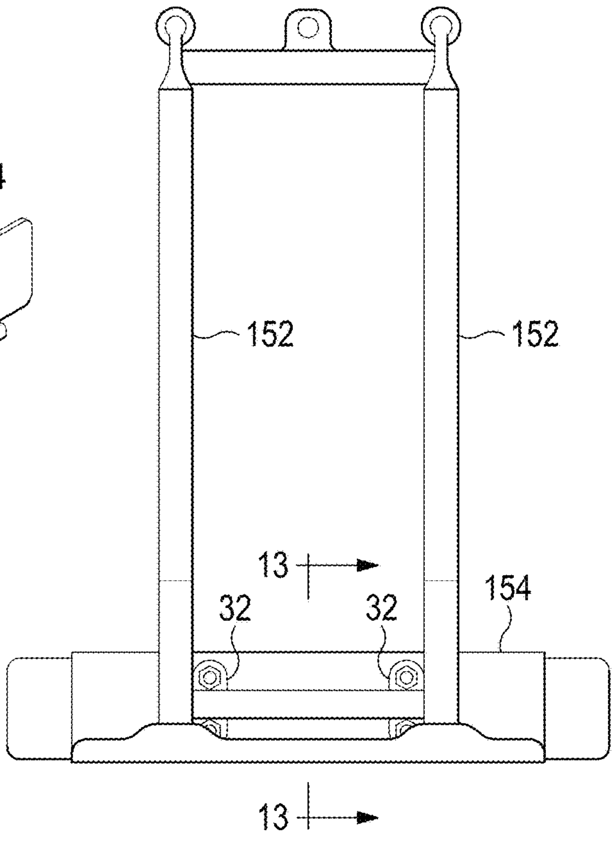
FIG. 12 is an elevational view of the clamp arm assembly shown in FIG. 11.
Figure 13:
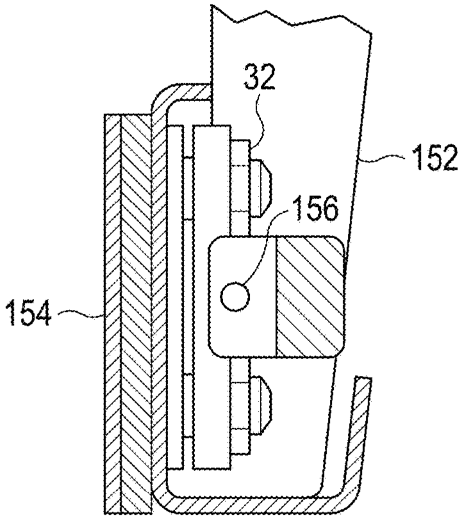
FIG. 13 is a sectional view taken along line 13-13 of FIG. 12, showing the locations of adjustable pivoting clamp pad support assemblies.
Figure 14:
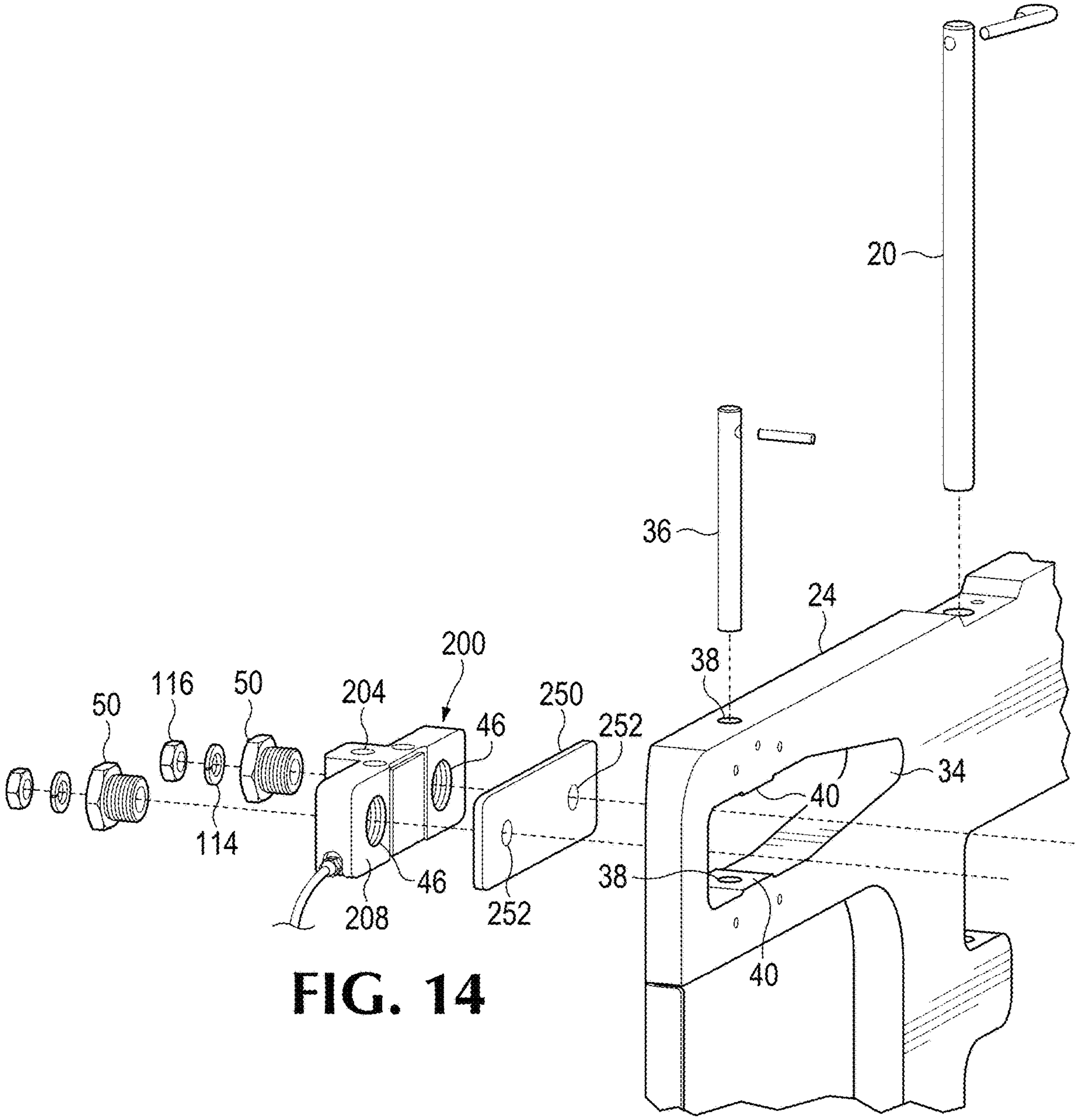
FIG. 14 is an exploded isometric view of a portion of FIG. 4 including an alternative embodiment of one of the adjustable pivoting clamp pad support assemblies, at an enlarged scale.

As shown in FIGS. 11, 12, and 13, a clamp arm assembly 148 included in such a layer picker attachment 144 may have a pair of horizontal motors 150 such as hydraulic rams to move a pair of vertical legs 152, to which a clamp pad 154 is attached by a pair of pivoting clamp pad support assemblies 32 supported on and free to pivot about a horizontal pivot shaft 156 extending between the legs 152. Load cells 82 in the pivoting clamp pad support assemblies 32 can be used in a manner similar to that described above to ensure that sufficient but not excessive forces are applied to a load such as a layer of cases of soft drink cans as shown in FIG. 10.

Referring to FIGS. 14, 15, 16, 17, 18, and 19, in another embodiment of the pivoting load bearing assembly with force sensors, the pressing or clamping forces urging the clamp pads 28 and 30 toward each other is determined by measuring the resulting strain in the bearing blocks of the adjustable pivoting clamp pad support assembly 32. The bearing block 200 defines an elongate rectangular base beam 202. A pair of threaded bores 46, one proximate each end of the base beam 202, extends through the base beam and normal to an inner face 208 of the bearing block. The bearing block 200 also defines a pivot pin bore 204 preferably located midway between the threaded bores 46 in the base beam 202 and having a longitudinal axis normal to a longitudinal axis 206 of the base beam. The pivot pin bore 204 receives a pivot pin 36 to pivotally secure the bearing block 200 to the finger-like member 24 of the stabilizer 16.

Referring to FIGS. 14, 15, 16, 17, 18, and 19, in another embodiment of the pivoting load bearing assembly with force sensors, the pressing or clamping forces urging the clamp pads 28 and 30 toward each other is determined by measuring the resulting strain in the bearing blocks of the adjustable pivoting clamp pad support assembly 32. The bearing block 200 defines an elongate rectangular base beam 202 and includes a clamping-force isolating subassembly 201. A pair of threaded bores 46, one proximate each end of the base beam 202, extends through the base beam and normal to an inner face 208 of the bearing block. The bearing block 200 also defines a pivot pin bore 204 preferably located midway between the threaded bores 46 in the base beam 202 and having a longitudinal axis normal to a longitudinal axis 206 of the base beam. The pivot pin bore 204 receives a pivot pin 36 to pivotally secure the bearing block 200 to the finger-like member 24 of the stabilizer 16. The inner face 208 of the pivot block 200 preferably includes a relieved portion 210 located midway between the ends to the base beam 202 to receive a circuit board 212. A blind central cavity 214 which may be cylindrical preferably extends into the bearing block 200 in a direction perpendicular to the axis of the pivot pin bore 204 from approximately the center of the relieved portion 210 of the inner face 208 of the bearing block. Preferably, the bearing block 200 also defines a passageway 242 connecting an end portion of the base beam to the central cavity 214 to enable connection of a signal conductor 98 to the circuit board 212 in the relieved portion 210 of the inner face 208 and plural passageways 244 connecting the central cavity to the respective ones of the sensor cavities 216, 218, 220, 222 to enable leads 246 of the strain gauge assemblies 240 to be connected to the centrally located circuit board.

Figure 15:
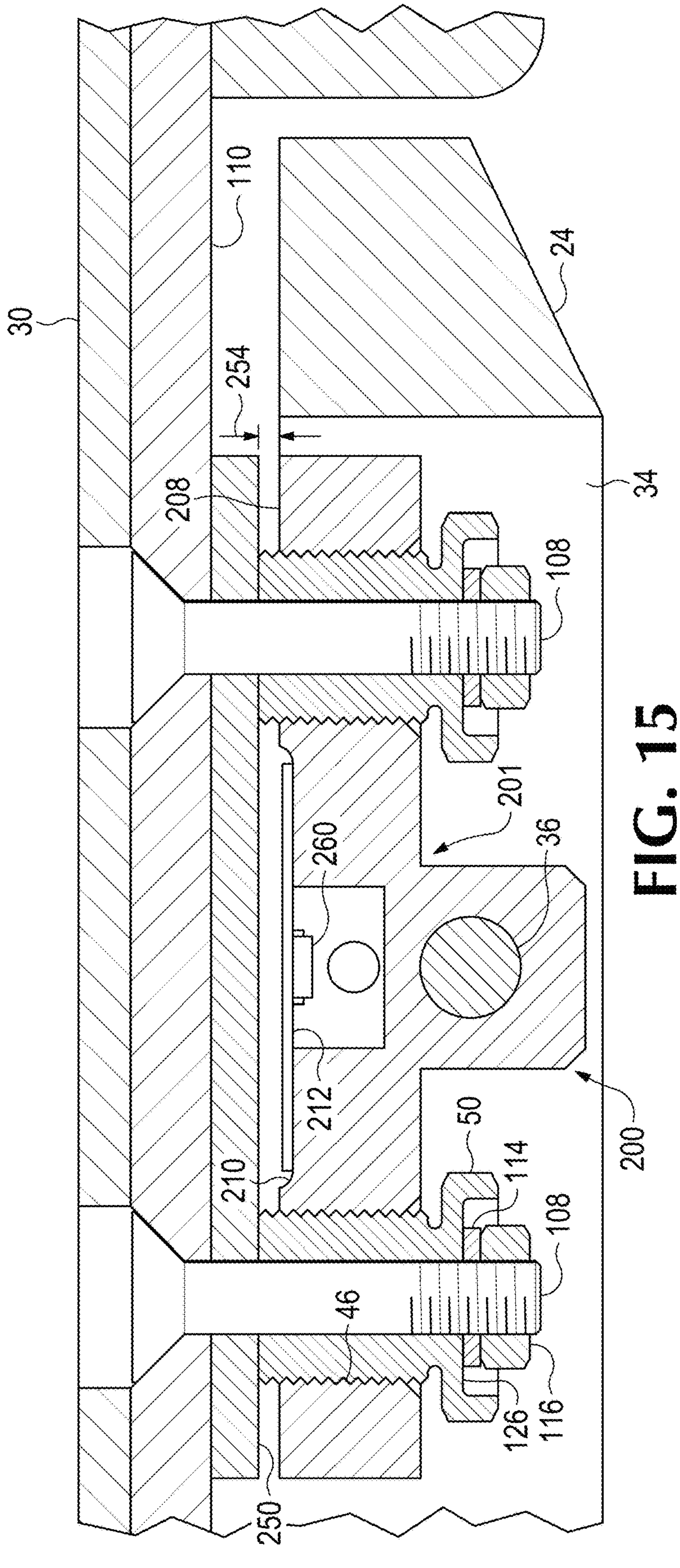
FIG. 15 is a sectional view of one of the adjustable pivot assemblies of alternate construction included in the clamp arm assembly, taken along line 2-2 in FIG. 1, at an enlarged scale.
Figure 16:
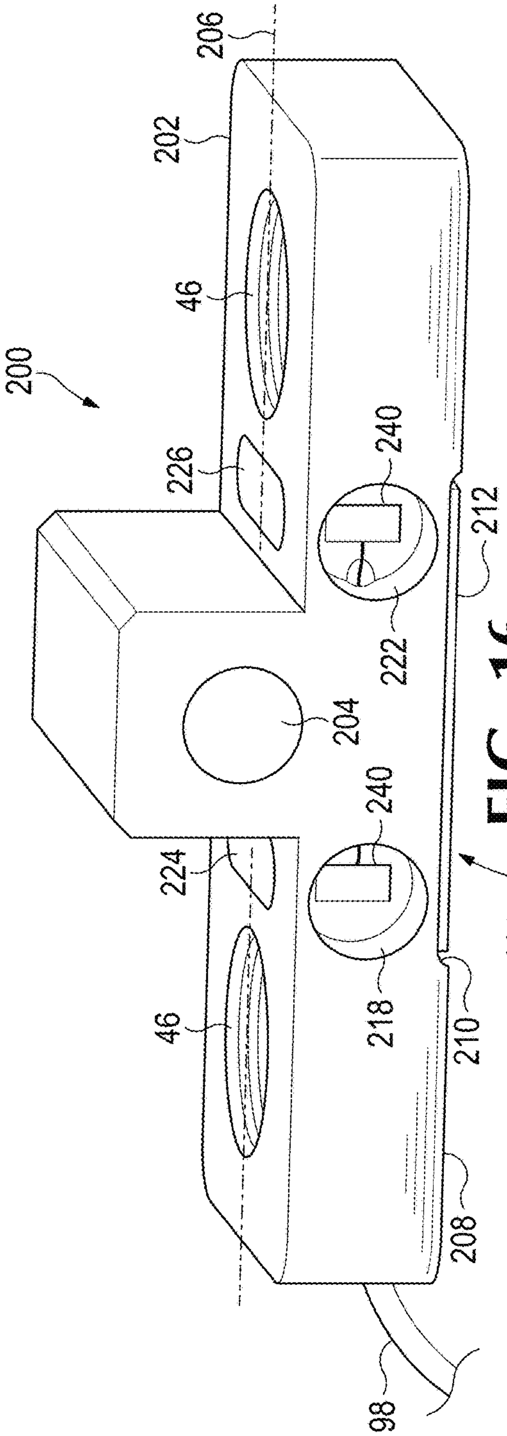
FIG. 16 is a perspective view of the bearing block shown in FIG. 14, showing cavities in which strain gauges are mounted in the bearing block.
Figure 17:
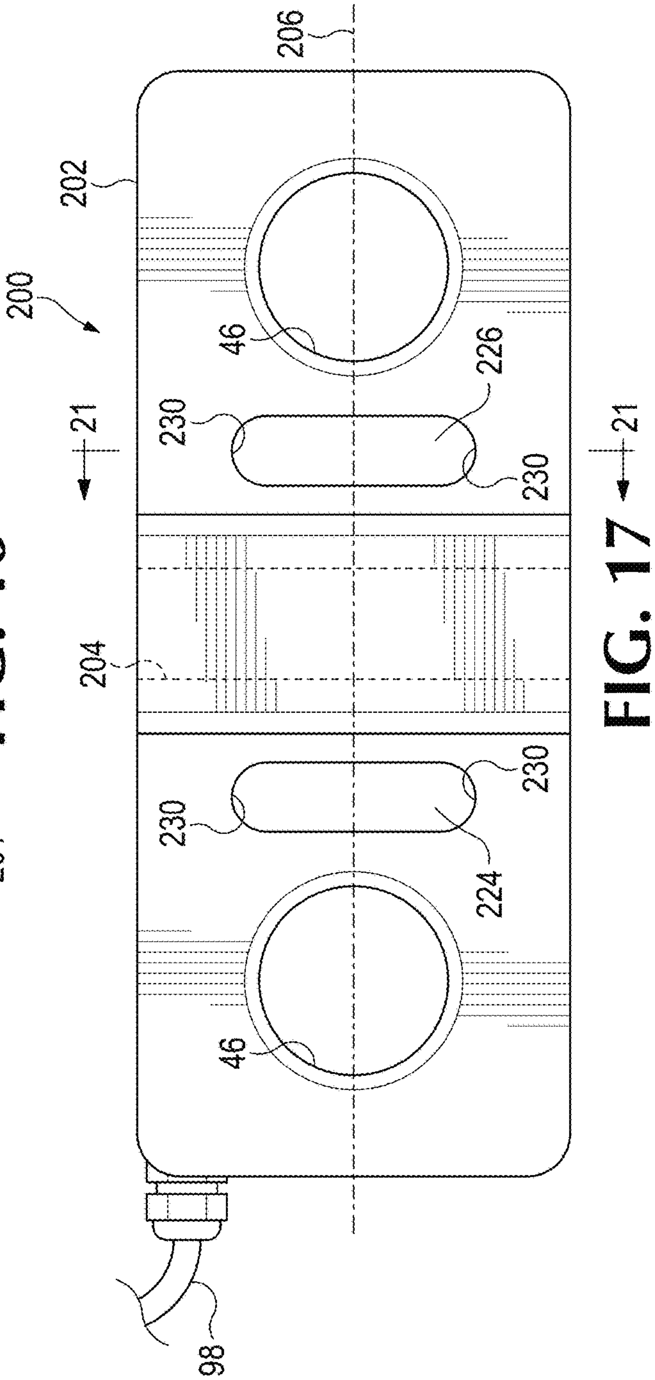
FIG. 17 is a top plan view of the bearing block of FIG. 14.
Figure 18:
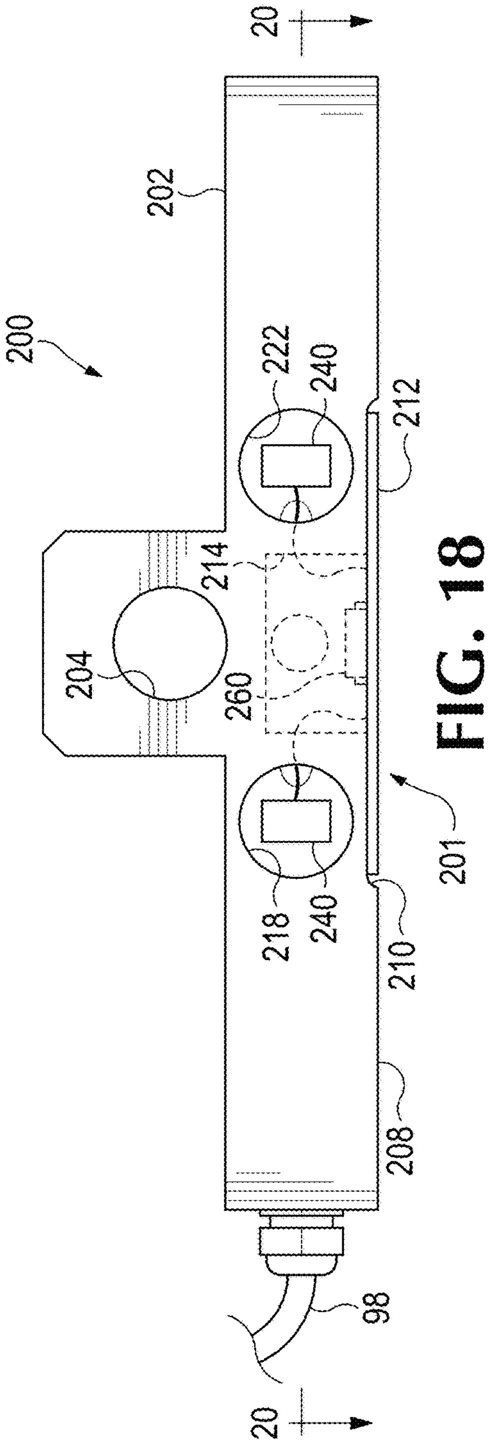
FIG. 18 is an elevation view of bearing block shown in FIG. 14.
Figure 19:
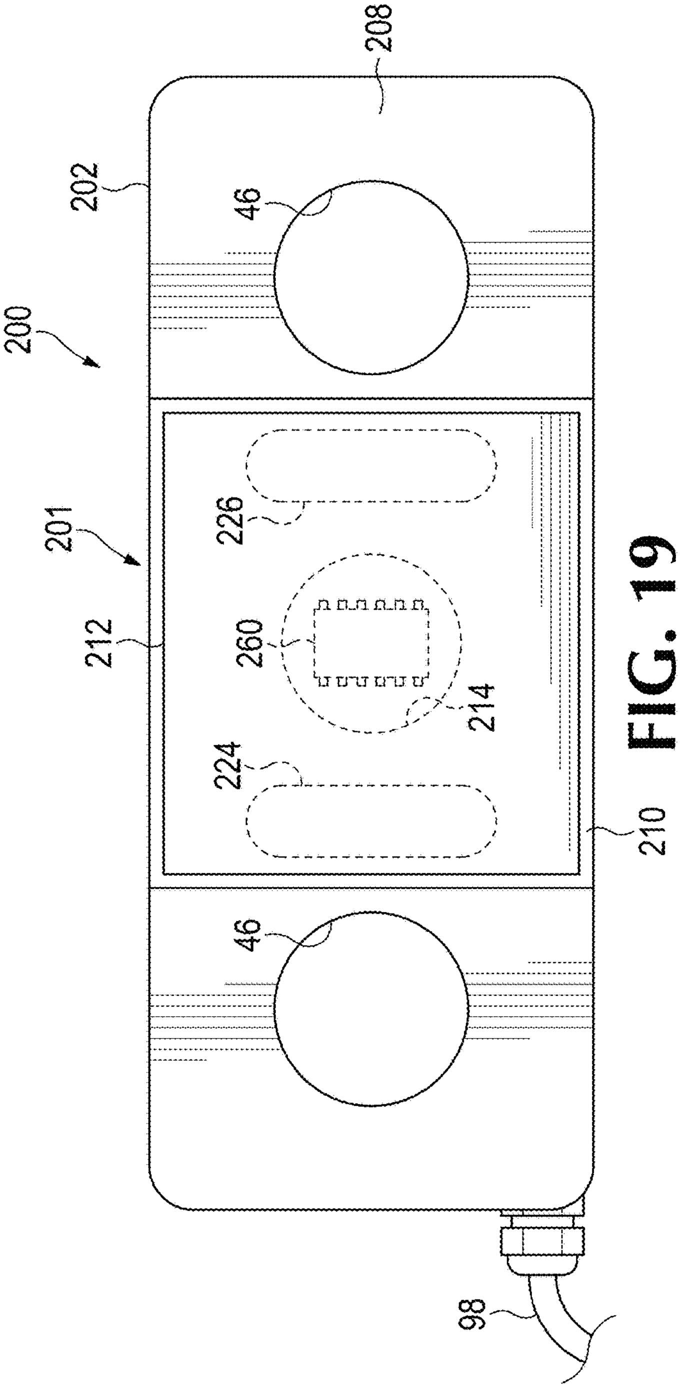
FIG. 19 is a bottom plan view of the bearing block shown in FIG. 14
Figure 20:
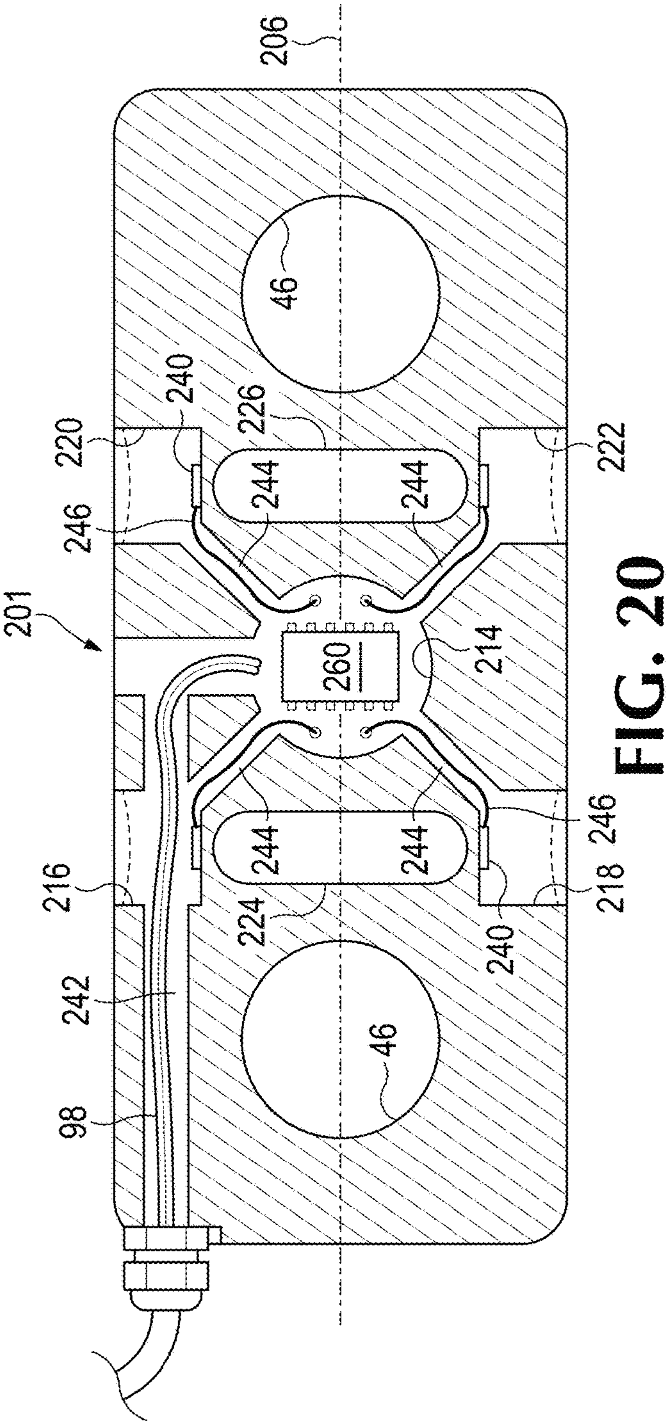
FIG. 20 is a sectional view, taken along line 20-20 in FIG. 18, showing the arrangement of strain gauges and interconnection with an integrated circuit arranged to receive information from the strain gauges.
Figure 21:
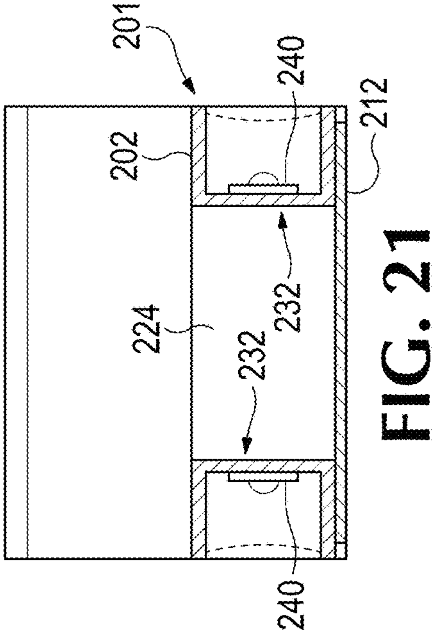
FIG. 21 is a sectional view taken along line 21-21 of FIG. 17, showing strain gages attached to a surface of a measurement portion of the bearing block defined by slots in the bearing block and blind cavities in the sides of the bearing block.

As illustrated in FIG. 15 and described above, an adjustment collar 50, having external threads, and a threaded bore 112 and which may have a portion shaped to be engaged by a wrench, is threaded into each of the bores 46. The threaded ends of the adjustment collars 50 bear on a spacer plate 250 having a pair of bores 252 coaxially aligned with the bores 46 in the bearing block 200. Fasteners 108 engaging and passing through the supporting plate 110 for the clamp pad 28 or 30 extend through the bores 252 in the spacer plate 250 and are threaded into the threaded bores 112 of the collars 50. The fasteners 108 secure the clamp pads 28, 30 to the bearing block and clamp the spacer plate 250 between the supporting plate 110 and the ends of the adjustment collars 50. A nut 116 and a washer 114 lock each of the fasteners 108 in the threaded bore 112 of the respective adjustment collar 50. The inner ends 120 of the adjustment collars 50 extend proud of the inner face 208 of the bearing block 200 maintaining a gap 254 between the inner face 208 of the bearing block 200 and the spacer plate 250. As described in detail above, the orientation and, to some extent, the shape of each clamp pad 28 or 30 may be changed by rotating the adjustment collars 50 of the clamp pad support assemblies 32 to vary the width and or shape of the gap 254 between the spacer plate 250 and the fingerlike member 24 of the clamp's stabilizer 16.

The pressing or clamping force exerted on the carton or other clamped load by the clamp pads 28, 30 is transmitted from each finger-like member 24 to the respective pivot pin 36 in the pivot pin bore 204 at the center of the base beam 202 of the respective bearing block 200. The base beam 202 transmits the clamping force, through the adjustment collars 50, to the spacer plate 250, the clamp pad supporting plate 110 and the clamp pad 28 or 30 where it is resisted by the clamped load. The base beam 202 is substantially a centrally loaded simply supported beam of varying cross-sections and moments of inertia. Since the cross-sections and moments of inertia of the measurement portions 232 are substantially less than the cross-sections and moments of inertia of the adjacent portions of the base beam 202, the highest stresses and measurable strains are experienced by the measurement portions when the center of the pivot block is deflected toward the clamp pad 28, 30 by the pivot pin 36. The strain produced by the bending is sensed by the strain gauge assemblies 240 attached to the walls of the measurement portions 232. Preferably, the strain gauge assemblies comprise plural strain gauges such as a gauge rosette typically comprising two, three, or four strain gauges with relative orientations of 30°, 45°, 60°, or 90°. Three gauge rosettes with two gauges oriented normal to each other and the third gauge oriented at 45° are common and enable the measured strains to be resolved for the principal strains and their directions. The outputs of the strain gauge assemblies 240 attached to the pivot bearing block 200 are preferably input to an integrated circuit (IC) 260 attached to the circuit board 212. The IC 260 preferably resolves the strains sensed by the plural strain gauges to isolate the bending strain induced by the pivot pin 36 in the measurement portions of the bearing block 200 and preferably amplifies an analog output signal representing and, preferably, proportional to the clamping force applied to the load. As illustrated in FIG. 7, the output signal from the various load cells, comprising the measurement portions 232 of the bearing blocks 200, the strain gauge assemblies 240 and the ICs 260, is transmitted via the signal conductors 98 to a central controller 128 which can indicate the force exerted by each pivoting clamp pad assembly 72 or which utilize the signal in a feedback system to control the clamping force applied to the clamped load.

Figure 22:
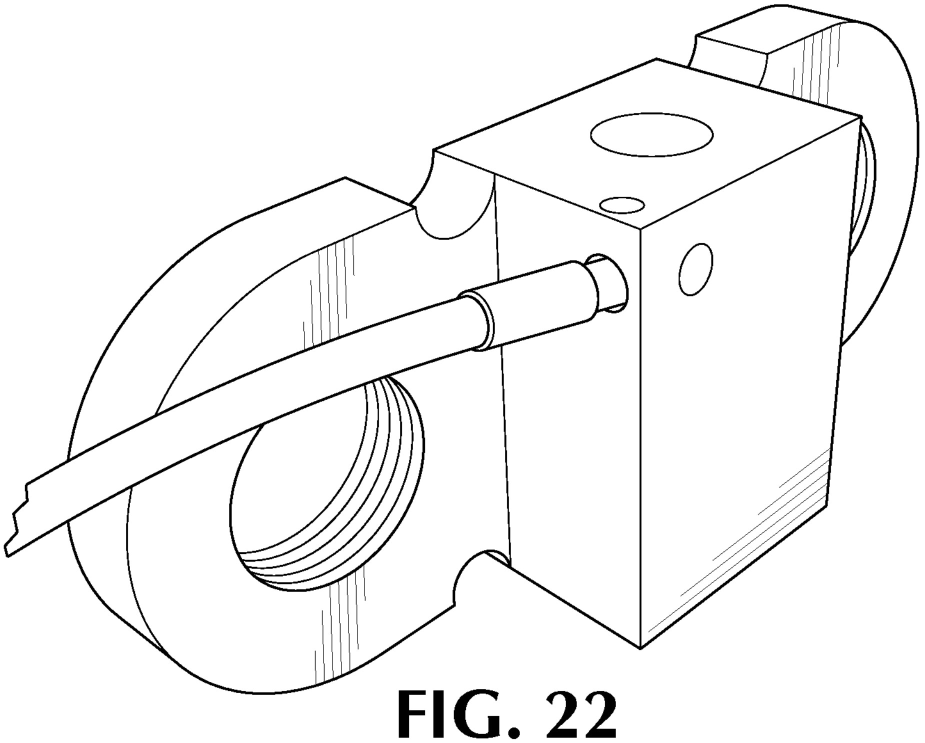
FIG. 22 is a front view of one of the additional load cells used to sense a vertical load.
Figure 23:
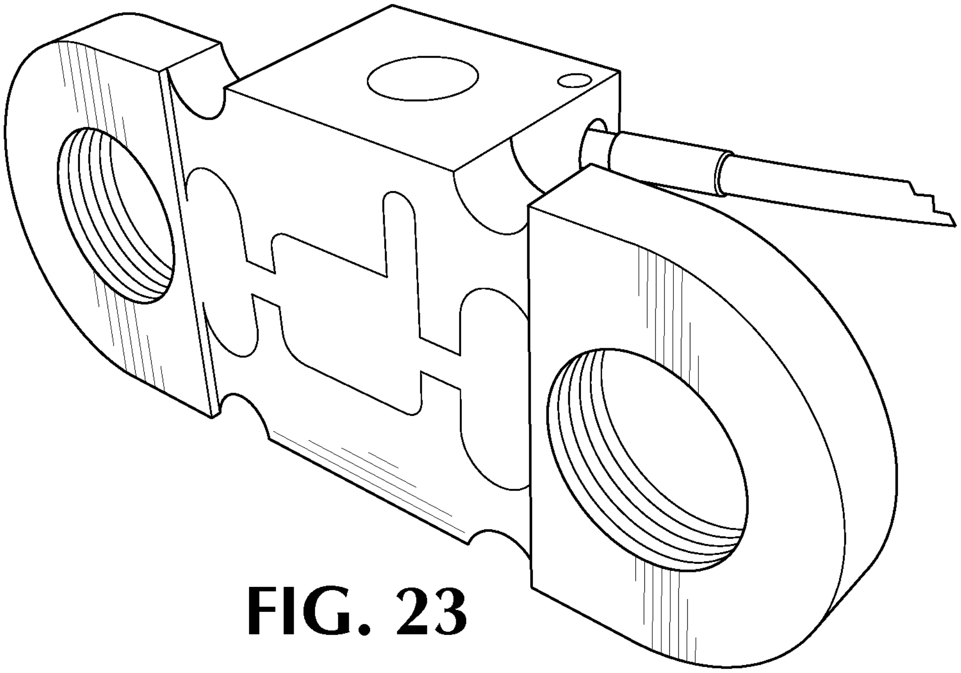
FIG. 23 is a back view of one of the additional load cells used to sense a vertical load.
Figure 24:
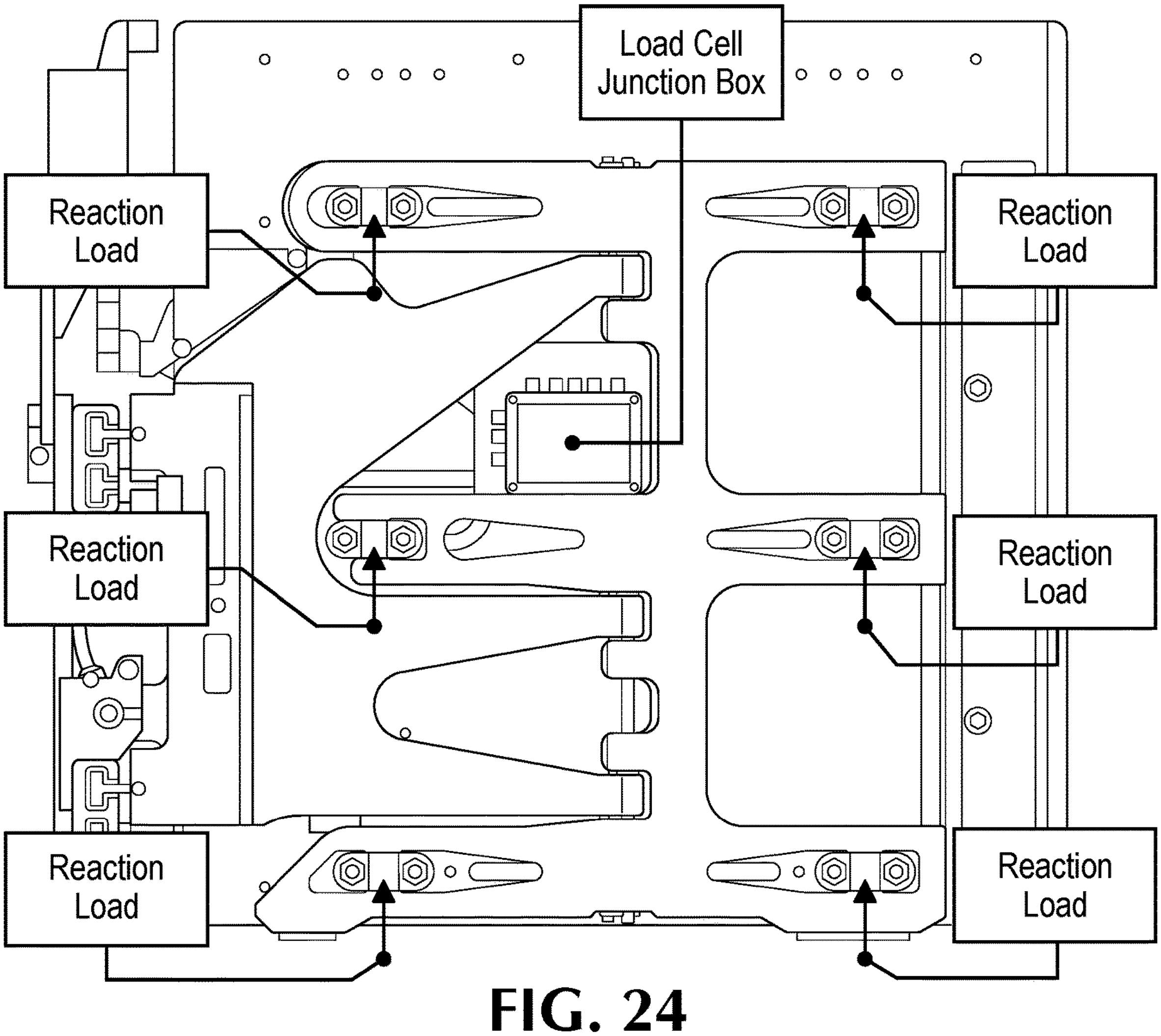
FIG. 24 is a side view of a carton clamp showing the vertical load sensing capabilities of the system.

Referring to FIGS. 22 and 23, in another embodiment, FIG. 22 is a front view of one of the additional load cells oriented to sense a vertical load. FIG. 23 is the back view of the load cell. FIG. 24 illustrates the side view of the carton clamp with the additional load cells shown to sense the vertical load.

The adjustablock system may be presented with integrated clamp force sensing, where the sensing is accomplished with an additional set of strain gages oriented to sense the vertical load. The enhanced adjustablock works on the same principles (reduced section to amplified signal generated by attached strain gages) as is described in the other embodiments described herein, with the addition of another set of strain gages oriented to sense the vertical load.

One version of this embodiment may include: four shear strain gages (8 total gages) mounted on the top and bottom surfaces in a reduced section area to measure clamp force; two shear strain gages (4 total gages) mounted on the centerline to measure vertical force; a 10 mm center web allowing for a consistent force application point through the center of the adjustablock into the main pivot pin; and raised top and bottom bosses to concentrate the vertical load as close as possible to the pivot pin centerline.

An alternate version of this embodiment may include: a contact pad with 6 adjustablocks, 12 per clamp.

This new vertical load sensing element gives the added ability to measure load weight and calculate the lateral and horizontal center of gravity of the load by using a force balance calculation.

It allows the user to measure vertical and horizontal forces at each adjustablock location. It can be used to calculate both lateral and horizontal center of gravity. With this information, weight and clamp force measurements can be used for a force feedback, weight based, clamp force handling solution minimizing product damage.

This in turn provides stability information to the truck stability controller to mitigate unstable handling scenarios and increase acceptable range of motion.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method of adjusting a load grasping assembly for a lift truck including a load grasping assembly including a clamp arm, a clamp pad mounted to the clamp arm through a pivoting clamp pad support assembly, at least four pairs of clamp shear strain gages for measuring clamp force, at least two pairs of vertical shear strain gages for measuring vertical force, the method comprising:

(a) providing a test load body having a predetermined configuration;

(b) grasping the test load body with the load grasping assembly;

(c) obtaining a signal from said clamp shear strain gages representative of a magnitude of a force exerted on said clamp pad in a predetermined direction by said pivoting clamp pad support assembly;

(d) obtaining a signal from said vertical shear strain gages representative of a magnitude of vertical load;

(e) determining from said signal the magnitude of a grasping force exerted in said predetermined direction and a vertical direction by said clamp pad support assembly while grasping the test load body;

(f) determining from said signal a lateral and horizontal center of gravity of the vertical load; and (g) in response, adjusting a clamping force applied to said clamp arm.

2. A method of adjusting a load grasping assembly for a lift truck including a load grasping assembly including a clamp arm, a clamp pad mounted to the clamp arm through a pivoting clamp pad support assembly, a force sensor included in said clamp pad support assembly, and at least a pair of vertical load sensors, wherein said clamp pad is mounted on said clamp arm using a plurality of said pivoting clamp pad support assemblies each including a respective said force sensor, the method comprising:

(a) providing a test load body having a predetermined configuration;

(b) grasping the test load body with the load grasping assembly;

(c) obtaining a respective signal from each of said plurality of force sensors representative of a force exerted in a predetermined direction by a respective one of said plurality of pivoting clamp pad support assemblies and from each vertical load sensor;

(d) determining a separate respective grasping force exerted in said predetermined direction by each one of said plurality of pivoting clamp pad support assemblies while grasping the test load body;

(e) determining a distribution of said grasping forces of said plurality of clamp pad support assemblies of a clamp arm;

(f) comparing said distribution of said grasping forces of said plurality of clamp pad support assemblies with a predetermined desired distribution; and (g) in response, adjusting a distance adjustment assembly included in one of said pivoting clamp pad support assemblies and thereby adjusting a radial distance between a pivot axis of said one of said clamp pad support assemblies and said clamp pad mounted through said one of said plurality of pivoting clamp pad support assemblies.

3. The method of claim 2, wherein said step of determining a distribution of said grasping forces includes observing the respective electrical signal representative of the respective force exerted by each of said plurality of pivoting clamp pad support assemblies.

4. The method of claim 3 including receiving a respective signal from each of said vertical force sensors in a controller.

* * * * *